(12) United States Patent
Chen et al.

(10) Patent No.: US 12,222,464 B2
(45) Date of Patent: Feb. 11, 2025

(54) CONCURRENT OIL SATURATION AND POROSITY IMAGING USING COMPLETION-BASED ON-DEMAND ELECTRODES

(71) Applicant: ARAMCO SERVICES COMPANY, Houston, TX (US)

(72) Inventors: Hsieh Chen, Cambridge, MA (US); Martin E. Poitzsch, Cambridge, MA (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 20 days.

(21) Appl. No.: 18/325,731

(22) Filed: May 30, 2023

(65) Prior Publication Data

US 2024/0402380 A1 Dec. 5, 2024

(51) Int. Cl.
*E21B 43/26* (2006.01)
*E21B 47/12* (2012.01)
*G01V 3/20* (2006.01)
*G01V 3/38* (2006.01)

(52) U.S. Cl.
CPC .............. *G01V 3/38* (2013.01); *E21B 43/26* (2013.01); *E21B 47/12* (2013.01); *G01V 3/20* (2013.01)

(58) Field of Classification Search
CPC .......... E21B 43/26; E21B 47/12; G01V 3/20; G01V 3/38
See application file for complete search history.

(56) References Cited

U.S. PATENT DOCUMENTS

| 5,233,304 | A  | 8/1993  | Hubans |
| 6,667,621 | B1 | 12/2003 | Benimeli |
| 6,778,918 | B2 | 8/2004  | Delhomme et al. |
| 6,788,065 | B1 | 9/2004  | Homan et al. |

(Continued)

FOREIGN PATENT DOCUMENTS

WO 2018125207 A1 7/2018

OTHER PUBLICATIONS

Marsala et al.; "Crosswell Electromagnetic Tomography in Haradh Field: Modeling to Measurements", Saudi Aramco Journal of Technology, Winter 2007, pp. 65-73 (9 pages).

(Continued)

*Primary Examiner* — Matthew R Buck
(74) *Attorney, Agent, or Firm* — Osha Bergman Watanabe & Burton LLP

(57) ABSTRACT

Methods and systems for determining electrical characteristics of a subsurface formation are disclosed. The method may include installing a first electrically insulating spacer between well liners in the well to form an on-demand electromagnetic source electrode and installing a second electrically insulating spacer between well liners in the well to form an on-demand electromagnetic receiver electrode. The method may further include performing an electrical survey using the on-demand electromagnetic source and receiver electrodes, determining a map of the at least one electrical characteristic in a subsurface region surrounding on-demand electromagnetic source and receiver electrodes based on the electrical survey, determining a map of at least one formation property based on the map of the electrical characteristic, and updating a hydrocarbon reservoir production plan based on the map of at least one formation property.

17 Claims, 12 Drawing Sheets

(56) References Cited

U.S. PATENT DOCUMENTS

| | | | |
|---|---|---|---|
| 8,392,119 | B2 | 3/2013 | Alumbaugh et al. |
| 8,638,103 | B2 | 1/2014 | Rosthal et al. |
| 8,901,931 | B2 | 12/2014 | Esmersoy |
| 9,739,905 | B2 | 8/2017 | Sena |
| 10,267,943 | B2 | 4/2019 | Marsala et al. |
| 2003/0209347 | A1 | 11/2003 | Clark et al. |
| 2003/0220750 | A1 | 11/2003 | Delhomme et al. |
| 2010/0259268 | A1 | 10/2010 | Zhang et al. |
| 2011/0036569 | A1 | 2/2011 | Bass et al. |
| 2011/0308789 | A1* | 12/2011 | Zhang ............ G01V 3/28 166/66.5 |
| 2012/0191353 | A1 | 7/2012 | Wilt et al. |
| 2012/0293179 | A1 | 11/2012 | Colombo et al. |
| 2014/0167767 | A1 | 6/2014 | Herrera et al. |
| 2015/0061684 | A1 | 3/2015 | Marsala et al. |
| 2015/0101817 | A1 | 4/2015 | White et al. |
| 2015/0369949 | A1 | 12/2015 | Cuevas et al. |
| 2016/0266269 | A1* | 9/2016 | Wilson ............ G01V 3/108 |
| 2016/0290124 | A1 | 10/2016 | Chemali et al. |
| 2017/0138132 | A1 | 5/2017 | Wilson et al. |
| 2017/0284190 | A1 | 10/2017 | Dashevsky et al. |
| 2017/0292367 | A1 | 10/2017 | Fouda et al. |
| 2018/0128097 | A1 | 5/2018 | DePavia et al. |
| 2018/0203154 | A1* | 7/2018 | Gabelmann ............ G01V 3/34 |
| 2018/0223654 | A1 | 8/2018 | Roberson et al. |
| 2018/0231681 | A1 | 8/2018 | Katterbauer et al. |
| 2018/0259672 | A1 | 9/2018 | Samson et al. |
| 2018/0283168 | A1 | 10/2018 | Ranjan et al. |
| 2020/0319365 | A1 | 10/2020 | Colombo et al. |
| 2020/0348440 | A1 | 11/2020 | Cancelliere et al. |
| 2020/0363554 | A1 | 11/2020 | Colombo et al. |
| 2021/0140307 | A1 | 5/2021 | McNeice et al. |
| 2022/0099859 | A1* | 3/2022 | Chen ............ G01V 3/30 |

OTHER PUBLICATIONS

Marsala et al.; "Saturation Mapping in the Interwell Reservoir Volume: A New Technology Breakthrough", SPE-187371-MS, Society of Petroleum Engineers Inc., Oct. 2017 (10 pages).

Bryant et al.; "Utility and Reliability of Cemented Resistivity Arrays in Monitoring Waterflood of the Mansfield Sandstone, Indiana, USA", SPE 71710, Society of Petroleum Engineers Inc., Oct. 2001 (16 pages).

Bryant et al.: "Real-Time Monitoring and Control of Water Influx to a Horizontal Well Using Advanced Completion Equipped with Permanent Sensors", SPE 77522, Society of Petroleum Engineers, Oct. 2004 (13 pages).

Van Kleef et al.; "Water Flood Monitoring in an Oman Carbonate Reservoir Using a Downhole Permanent Electrode Array", SPE 68078, Society of Petroleum Engineers Inc., Mar. 2001 (11 pages).

Kuchuk et al.; "Determination of In Situ Two-Phase Flow Properties Through Downhole Fluid Movement Monitoring", SPE 116068, Society of Petroleum Engineers, Sep. 2008 (13 pages).

Jackson et al.; "Spontaneous Potentials in Hydrocarbon Reservoirs During Waterflooding: Application to Water-Front Monitoring", SPE 135146, Sep. 2010 (17 pages).

International Search Report and Written Opinion of the International Searching Authority issued in corresponding International Application No. PCT/US2021/052919, mailed on Jan. 17, 2022 (20 pages).

Nekut A G: "Crosswell Electromagnetic Tomography in Steel-Cased Weels", Geophysics, Society of Exploration Geophysicists, US, vol. 60, No. 3. May 1, 1995, pp. 912-920, XP000515653 (9 pages).

N. Panwar et al.; "Induced Polarization of Carbonates", Journal of Geophysical Research: Solid Earth, American Geophysical Union, 2021; 126(6); pp. 1-24 (24 pages).

S. R. Hussaini and J. Dvorkin; "Specific surface area versus porosit from digital images", Journal of Petroleum Science and Engineering; vol. 196; Aug. 16, 2020; pp. 1-12 (12 pages).

Non-Final Office Action issued in corresponding U.S. Appl. No. 17/038,345, filed Mar. 27, 2023 (33 pages).

Anthony G. Nekut (Crosswell electromagnetic tomography in steel-cased wells, GEOPHYSICS, vol. 60, No. 3 (May-Jun. 1995); p. 912-920) (Year: 1995).

Sena et al. (Borehole Electromagnetic Technique for Reservoir Imaging and Monitoring from Uncased Sections of a Well Using Adjacent Casings as Receiver Antennas,2019, International Petroleum Technology Conference, pp. 1-7) (Year: 2019).

Shantsev et al. (Time-lapse CSEM: how important is survey repeatability, 2020, Geophys. J. Int. pp. 2133-2147) (Year: 2020).

\* cited by examiner

CONCURRENT OIL SATURATION AND POROSITY IMAGING USING COMPLETION-BASED ON-DEMAND ELECTRODES

BACKGROUND

Hydrocarbon resources are often located below the earth's surface, sometimes tens of thousands of feet below the surface. In order to extract hydrocarbon fluids, that is, oil and/or gas, hydrocarbon wells may be drilled to gain access to reservoirs found in subterranean porous rock formations. Wells may be drilled vertically into the earth or deviated from vertical, even up to and beyond horizontal in order to most effectively and efficiently access subsurface hydrocarbon reservoirs.

In some cases hydrocarbon wells may be cased to protect the mechanical integrity of the hydrocarbon well and the surrounding formations through which the wellbore may pass. Casing may be fixed in place by injecting cement into the annulus between the casing and the surrounding formation. Casing may be electrically conductive, for example, the casing may be made of some form of metal, particularly a form of steel. Less frequently, non-conductive casing may be used in hydrocarbon wells.

In other cases, uncemented liners, having the form of a hollow cylinder may be inserted into uncased portions of the hydrocarbon well to facilitate the production of hydrocarbons to the surface. Liners may be electrically conductive, for example, the liners may be made of some form of metal, particularly a form of steel. Less frequently, non-conductive casing may be used in hydrocarbon well.

During the productive lifetime of an hydrocarbon well, it may become desirable to stimulate a greater production rate of hydrocarbons. Such stimulation may include, without limitation, the drilling of additional "side-track" wells, the hydraulic stimulation of portions of an existing well, or the injections of acids ("acidization") to enhance fluid conductive pathways from the well to distant portions of the formation. In such cases, it may be advantageous to determine the spatial distribution of the porosity and the oil or water saturation values within the porosity in the vicinity of a well, or between two or more wells, to direct the type and location within the well of the contemplated stimulation.

Deep electromagnetic (EM) surveys have long been of great interest for oil companies as a means to determined oil saturation and porosity. EM surveys have provided invaluable information for reservoir-scale saturation mapping with unprecedented details. However, when conducted on existing wells, there may be some limitations for the EM surveys. For example, dedicated EM transmitters and receivers used for EM surveys may be thicker and longer than conventional logging tools, which may increase the difficulty for their conveyance for downhole surveys. Further, typical data acquisition time for these EM surveys may range from multiple days to weeks, resulting in downtimes for normal field operations and costs associated with the downtime. In addition, metal casings may greatly attenuate the EM sensitivity, which may limit which wells may be selected for monitoring and the resolution of the resulting reservoir property maps. Further, uncemented liners may prevent access by EM survey tools without the large cost of removing and the later replacing them after the survey.

Downhole permanent electrode arrays may offer the possibility of long-term continuous monitoring of the formation porosity and fluid saturations to aid in reservoir management. However, extremely high upfront cost for installation of downhole permanent electrode arrays (that may be in excess of US $10 million) as well as suboptimal reliability for the downhole sensors has limited their applicability.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method for determining electrical characteristics of a subsurface formation. The method may include, during completion of a first hydrocarbon well, installing at least one first electrically insulating spacer between a plurality of well liners in the well to form at least one on-demand electromagnetic source electrode, installing at least one second electrically insulating spacer between the plurality of well liners in the well to form at least one on-demand electromagnetic receiver electrode, and performing an electrical survey using the least one on-demand electromagnetic source electrode and the least one on-demand electromagnetic receiver electrode. The method may further include using a computer processor to determine a map of the at least one electrical characteristic in a subsurface region surrounding the least one on-demand electromagnetic source electrode and the least one on-demand electromagnetic receiver electrode based, at least in part, on the electrical survey, determine a map of at least one formation property based, at least on part, on the map of the at least one electrical characteristic in a subsurface region; and update a hydrocarbon reservoir production plan based, at least in part, on the map of at least one formation property.

In general, in one aspect, embodiments relate to a system for determining electrical characteristics of a subsurface formation. The system may include a plurality of well liners disposed in at least one hydrocarbon well, where each well liner comprises an electrically conductive material having a shape of a hollow cylinder, at least one first electrically insulating spacer disposed between two of the plurality of well liners to form at least one on-demand electromagnetic source electrode, and at least one second electrically insulating spacer disposed between two of the plurality of well liners to form at least one on-demand electromagnetic receiver electrode. The system may further include a well logging tool, configured to perform an electrical survey, a conveyance that disposes the well logging tool within the plurality of well liners, and a computer processor configured to determine a map of the at least one electrical characteristic in a subsurface region surrounding the least one on-demand electromagnetic source electrode and the least one on-demand electromagnetic receiver electrode, and determine a map of at least one formation property based, at least on part, on the map of the at least one electrical characteristic in a subsurface region.

Other aspects and advantages of the claimed subject matter will be apparent from the following description and the appended claims.

BRIEF DESCRIPTION OF DRAWINGS

The following is a description of the figures in the accompanying drawings. In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

Figure 1:
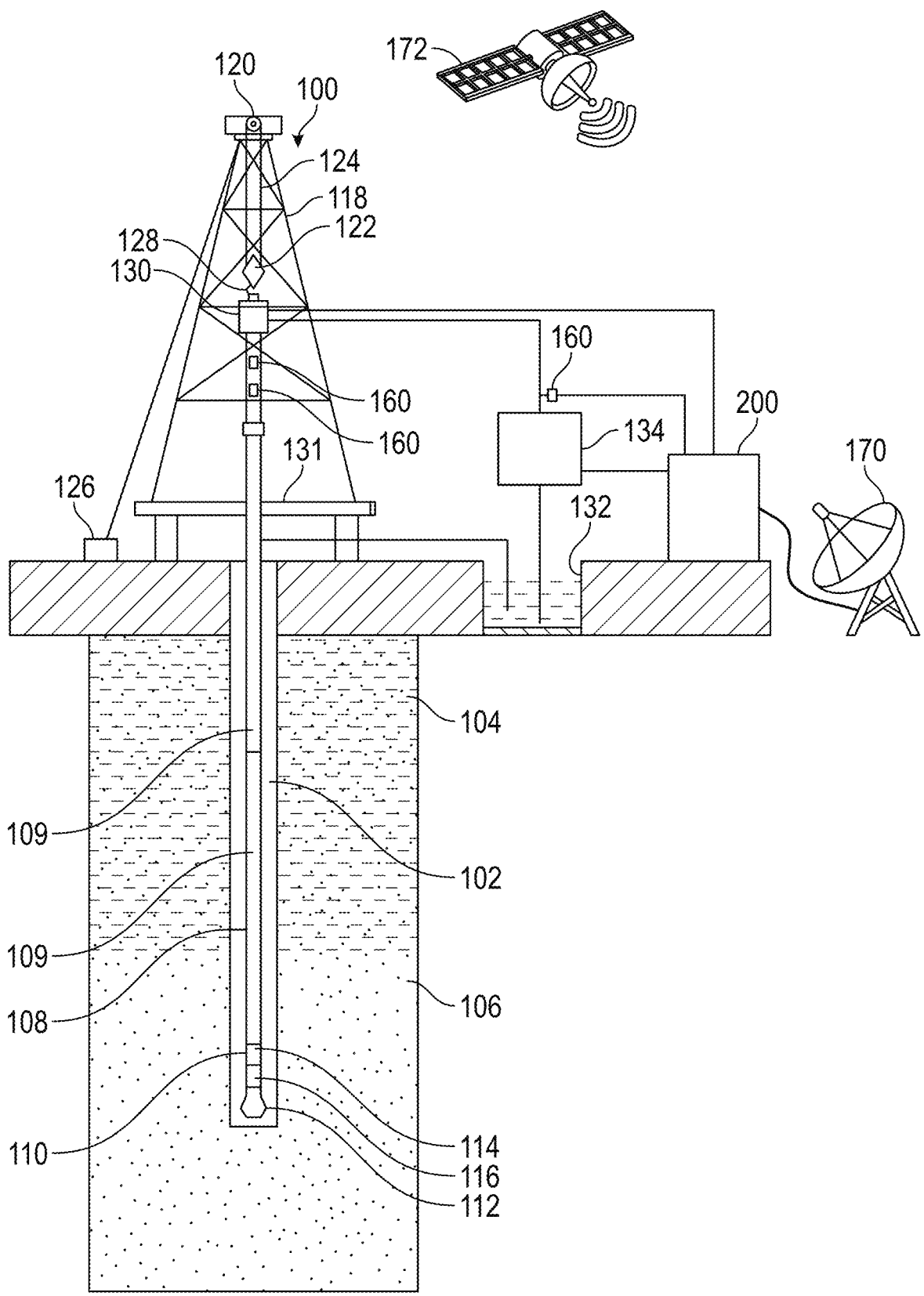
FIG. 1 is a schematic diagram of an example drilling well site in accordance with one or more embodiments.

In the following detailed description, certain specific details are set forth in order to provide a thorough understanding of various disclosed implementations and embodiments. However, one skilled in the relevant art will recognize that implementations and embodiments may be practiced without one or more of these specific details, or with other methods, components, materials, and so forth. In other instances, well known features or processes associated with hydrocarbon production systems have not been shown or described in detail to avoid unnecessarily obscuring descriptions of the implementations and embodiments. For the sake of continuity, and in the interest of conciseness, same or similar reference characters may be used for same or similar objects in multiple figures.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. Thus, for example, reference to an "on-demand electrode" includes reference to one or more of such on-demand electrodes.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the method may be omitted, repeated, and/or performed in a different order than the order shown. Accordingly, the scope disclosed herein should not be considered limited to the specific arrangement of steps shown in the method.

Although multiple dependent claims are not introduced, it would be apparent to one of ordinary skill that the subject matter of the dependent claims of one or more embodiments may be combined with other dependent claims.

In the following description of FIGS. 1-12, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

A deviated well, as used herein, describes a well whose wellbore is not vertical. A horizontal well is a special case of a deviated well in which the wellbore is essentially horizontal, but may deviate from the vertical by at least 80 degrees. A horizontal well may stay in a hydrocarbon reservoir for a greater length of the reservoir, allowing greater hydrocarbon production from the well.

A screen, or sand screen, or wire-wrapped screen, as used herein, refers to a device used to control formation sand from entering production tubing used to bring hydrocarbon fluids to the surface. A screen may include a perforated liner with perforations shaped as elongated slots or round holes. The dimensions of the screen and its components may be varied to suit the reservoir conditions.

As used herein, a logging unit, for example, a production logging unit, is a facility from which a logging engineer may control and monitor a well logging operation. A logging unit may contain such instruments as a data recorder, a depth recording system, and a winch.

In this disclosure, the terms hydrocarbon well, oil well, gas well, oil and gas well, and like terms may be used interchangeably without narrowing the type of well unless specifically stated.

Regarding directions of a coordinate system, the axial direction may be a direction parallel to an axis of rotation. In a hydrocarbon well, the axial direction may be the direction parallel to the wellbore and may be local. That is, if the wellbore changes direction along its length, one may still refer to an axial direction at any point along the wellbore as being tangential to the direction of the wellbore at that location. The radial direction is perpendicular to the axial direction and points along a radius away from the axis. The azimuthal direction is perpendicular to the axial and the radial directions.

FIG. 1 illustrates an exemplary hydrocarbon drilling well site 100. In general, well sites may be configured in a myriad of ways. Therefore, well site 100 is not intended to be limiting with respect to the particular configuration of the drilling equipment. Well site 100 is depicted as being on land. In other examples, well site 100 may be offshore, and drilling may be carried out with or without use of a marine riser. A drilling operation at well site 100 may include drilling a wellbore 102 into a subsurface including various formations, such as formations 104, 106. For the purpose of drilling a new section of wellbore 102, a drill string 108 is suspended within wellbore 102. Drill string 108 may include one or more drill pipes 109 connected to form conduit and a bottom hole assembly (BHA) 110 disposed at the distal end of the conduit. The BHA 110 may include a drill bit 112 to cut into the subsurface rock. The BHA 110 may include measurement tools, such as a measurement-while-drilling (MWD) tool 114 and logging-while-drilling (LWD) tool 116. Measurement tools 114, 116 may include sensors and hardware to measure downhole drilling parameters, and these measurements may be transmitted to the surface using any suitable telemetry system known in the art. The BHA 110 and drill string 108 may include other drilling tools known in the art but not specifically shown.

Drill string 108 may be suspended in wellbore 102 by a derrick 118. A crown block 120 may be mounted at the top of derrick 118, and a traveling block 122 may hang down from crown block 120 by means of a cable or drilling line 124. One end of cable 124 may be connected to a drawworks 126, which is a reeling device that can be used to adjust the length of cable 124 so that traveling block 122 moves up or down derrick 118. Traveling block 122 may include a hook 128 on which a top drive 130 is supported. Top drive 130 is coupled to the top of drill string 108 and is operable to rotate drill string 108. Alternatively, drill string 108 may be rotated by means of a rotary table (not shown) on the drilling floor 131. Drilling fluid (commonly called mud) may be stored in a pit (mud pit) 132, and at least one pump 134 may pump the mud from pit 132 into drill string 108. The mud may flow into drill string 108 through appropriate flow paths in top drive 130 (or a rotary swivel if a rotary table is used instead of a top drive to rotate drill string 108).

In one implementation, a system 200 may be disposed at or communicate with hydrocarbon well site 100. System 200 may control at least a portion of a drilling operation at well site 100 by providing controls to various components of the drilling operation. In one or more embodiments, system 200 may receive data from one or more sensors 160 arranged to measure controllable parameters of the drilling operation. As a non-limiting example, sensors 160 may be arranged to measure WOB (weight on bit), RPM (drill string rotational speed), GPM (flow rate of the mud pumps), and ROP (rate of penetration of the drilling operation). Sensors 160 may be positioned to measure parameter(s) related to rotation of drill string 108, parameter(s) related to travel of the traveling block 122, which may be used to determine ROP of the drilling operation, and parameter(s) related to flow rate of pump 134. For illustration purposes, sensors 160 are shown on drill string 108 and proximate mud pump 134. The illustrated locations of sensors 160 are not intended to be limiting, and sensors 160 could be disposed wherever drilling parameters need to be measured. Moreover, there may be many more sensors 160 than shown in FIG. 1 to measure various other parameters of the drilling operation. Each sensor 160 may be configured to measure a desired physical stimulus.

Further, in one or more embodiments, the system (200) may be equipped, or in communication, with a global positioning satellite (GPS) navigation system receiver (170). Likewise the global GPS receiver (170) may be in wireless communication with a GPS satellite (172). The GPS system may be used to determine a time reference at the wellsite. In particular, a GPS receiver (170) installed at a plurality of well sites may be used to determine a common time reference between the plurality. Such a common time reference may be used to measure a phase difference between phase measurements made by sensors (160) in different wellbores.

During a drilling operation at well site 100, drill string 108 is rotated relative to wellbore 102, and weight is applied to drill bit 112 to enable drill bit 112 to break rock as drill string 108 is rotated. In some cases, drill bit 112 may be rotated independently with a drilling motor. While cutting rock with drill bit 112, mud is pumped into drill string 108. The mud flows down drill string 108 and exits into the bottom of wellbore 102 through nozzles in drill bit 112. The mud in wellbore 102 then flows back up to the surface in an annular space between drill string 108 and wellbore 102 with entrained cuttings. The mud is returned to pit 132 to be circulated back again into drill string 108. Typically, the cuttings are first removed from the mud, and the mud is reconditioned as necessary, before pumping the mud again into drill string 108. In one or more embodiments, the drilling operation may be controlled by system 200.

Figure 2:
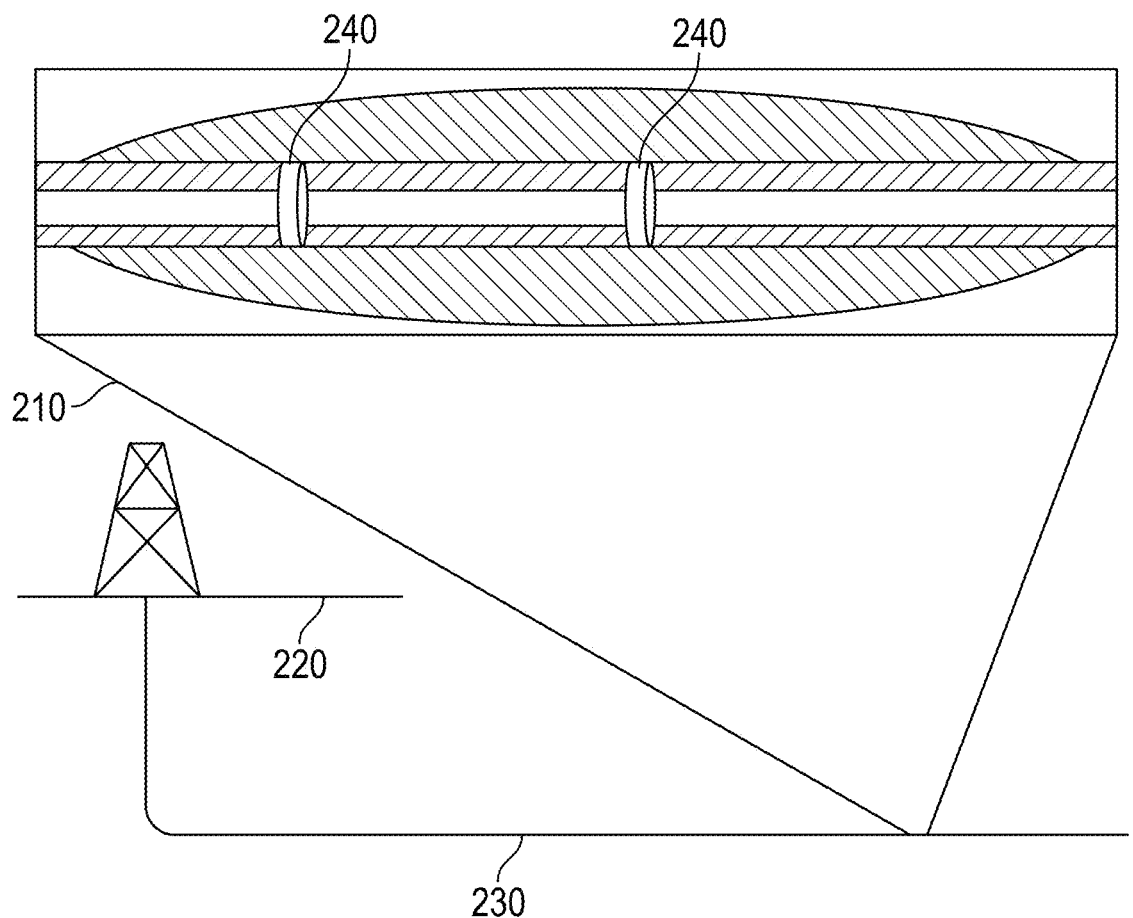
FIG. 2 is a schematic diagram of a downhole permanent electrode array.

Referring now to FIG. 2, a drilling rig 210 may be erected on a surface 220 for the purpose of drilling a well, particularly a well for the production of hydrocarbon fluids that may be contained in a subterranean porous rock formation, or reservoir. The surface 220 may be the earth's surface if the drilling rig 210 is a land rig. If the drilling location is offshore, the surface 220 may be on a drill ship, an offshore platform, or the like. The well may be deviated, and in particular, may be horizontal 230 in order to maintain the well in the hydrocarbon reservoir over an extended distance. Permanent downhole electrodes 240 may be installed mounted on the well completion to monitor saturation changes by providing a deep electromagnetic (EM) survey. However, such installations may be too expensive for some many applications.

Some hydrocarbon wells may be completed with metallic casing which may be inserted into the wellbore and cemented into place before being selectively perforated. However it is common practice, particularly in hydrocarbon reservoirs in strong, rigid (competent) reservoir rocks including, but not limited to, carbonate reservoirs rocks, to use openhole, or "barefoot", completions for many hydrocarbon wells. In openhole completions no casing is used in the deepest section of the wellbore. Instead, an uncemented metallic liner may be inserted into the well and may act as a conduit through which hydrocarbon fluids may flow to the surface. The portion of the liner that traverses the hydrocarbon reservoir may include slots or holes through which fluids may flow from the reservoir into the production conduit. The portion of the liner that traverses the hydrocarbon reservoir may include a sand-screen that prevents solid particles, such as sand, from entering the production conduit.

Nonmetallic couplings or breaks between drillpipe or well casing joints have never been enthusiastically accepted in the oil and gas industry due to concerns about reliability. Drillpipe has to sustain pressure differences and extreme bending and torques and tensions and compressions, and all that over millions of rotation cycles! Hydrocarbon well casing has to sustain very large pressure differences and is often inserted from the surface, thereby experiencing very high tensions and bending to keep a long string together. However, slotted well liners or sand-screens experience much less force and bending, and that over often just one installation cycle. Slotted well liners and sand-screens do not have to sustain any pressure differences and remain static in their rather generously oversized open-hole wellbore, once installed. For these reasons, nonmetallic, insulating couplings using standard well liner thread designs may be qualified for use in that environment. Possible materials for the insulating spacers include tough ceramics, such as transition-toughened zirconia (TTZ) and reinforced thermoplastics, such as glass-fiber-reinforced PEEK, which has been qualified for a number of downhole applications, including on logging while drilling (LWD) drilling tools.

In one or more embodiments, a method for monitoring fluid saturation changes in a subsurface formation from a well with an openhole completion may include a deep EM survey using well liners, that may each have the shape of a hollow cylinder, segmentally insulated with nonconductive spacers, that is, insulating spacers, and production logging (PL) tools. This method may include the installation of passive insulators, or spacers, between well liners, or well liner segments, in a way that produces minimum interference with well completion processes and much lower failure rates compared to the installation of permanent active downhole sensors. The upfront hardware required in one or more embodiments may include, without limitation, a plurality of insulated spacers to electrically isolate a plurality of electrically conducting (metallic) liner segments. In one or more embodiments, the insulated spacers may be constructed from ceramic, or thermoplastic materials, or other electrically insulating materials. In accordance with one or more embodiments, the number of insulated spacers may be small, for example five or fewer, thus the upfront hardware cost may be negligible, particularly when compared to permanent active downhole sensors.

Note, this is a qualitative improvement over conventional approaches in which the well liners are connected with metal-on-metal connections. The electrical "short-connections" so produced in a conventional liner assembly prevent the creation of isolated on-demand electrodes.

Further, the conveyance of a PL tool to convert the well liners into EM electrodes may be simpler, less costly, more versatile, and more sensitive compared to the conveyance of dedicated EM transmitters and receivers in existing completed wells. In addition, the conveyance of the PL tool could potentially be accomplished with wireline cased-hole tractors, which may be much less costly than using coiled tubing conveyance. Tough Logging Conditions (TLC) conveyance may also be used.

Further still, the method according to one or more embodiments may be applicable to open-hole, or barefoot, completions, where no casing is used in the wellbore so that produced hydrocarbon fluids flow directly into the wellbore, and thence through a liner, which may be equipped with a sand-screen, into the production tubing and to the surface.

Figure 3:
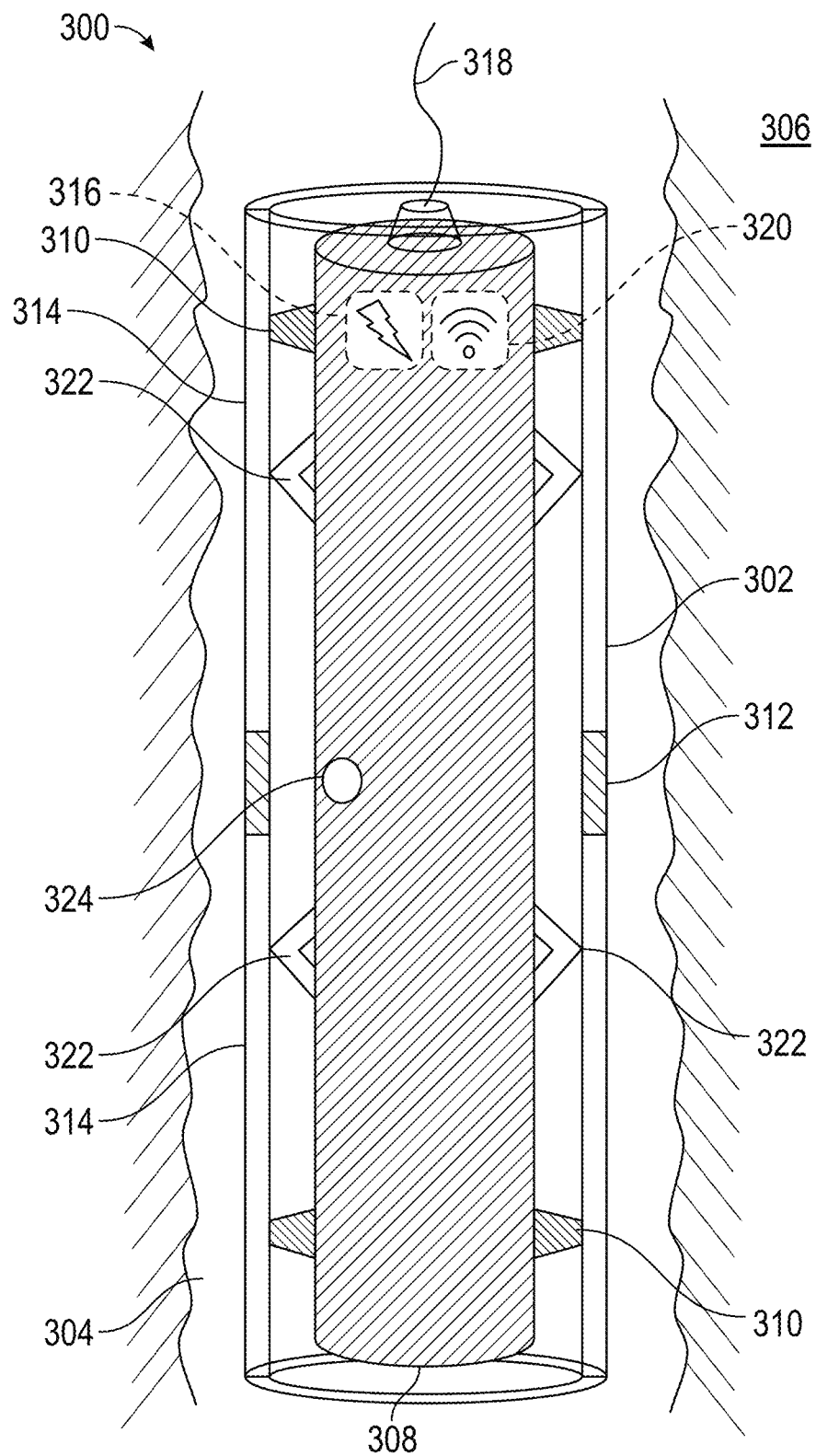
FIG. 3 depicts an electrical survey system in accordance with one or more embodiments.

Turning now to FIG. 3, FIG. 3 depicts a PL tool in accordance with one or more embodiments. The PL tool (300) is shown deployed inside a liner (302) that is itself deployed inside a wellbore (304) penetrating a rock formation (306). While the wellbore (304), liner (302), and PL tool (300) are all illustrated as running vertically this should not be interpreted as limiting the scope of the invention in any way. In other embodiments the wellbore (304), liner (302), and PL tool (300) may be deviated from the vertical, sometimes far from the vertical or may lie horizontally within the formation. In some embodiments the wellbore (304), liner (302), and PL tool (300) may be deviated beyond horizontal over some portions of the length of the wellbore (304).

In accordance with one or more embodiments, the liner (302) may include insulating spacers (312) positioned at intervals along the length of the liner (302), with each insulating spacers (312) spatially separating two conductive liner segments (314) disposed on either side of the insulating spacers (312). In addition to spatially separating two conductive liner segments (314) each insulating spacers (312) also electrically isolates the two conductive liner segments (314) from one another.

The PL tool (300) may include a housing, usually a cylindrical housing (308), that may conventionally have an outer diameter of 1 11/16 inches, and be fitted with one or more insulating centralizers (310) to keep the PL tool (300) approximately centralized within the liner (302) and to prevent the cylindrical housing (308) from touching the liner (302). The lengths of the insulating spacers (312) need not be large, for example the length may be less than 10 inches with diameters similar to the diameters of the well liners. In one or more embodiments, the PL tool (300). Further, the PL tool (300) may include a casing collar locator (324) that may be used for depth control, allowing proper positioning of the PL tool (300) with respect to the conductive liner segments (314) and insulating spacers (312). The depth control may be used to place the PL tool (300) in the correct position with respect to the well liner segments to be used as on-demand electrodes.

The PL tool (300) may further include a power connection (316) to receive power from the surface through a means of conveyance (318) and a communication connection (320) to receiver instructions from the surface and to send data to the surface via the means of conveyance (318). For example, means of conveyance may be, without limitation, a wireline that may be pulled by a downhole tractor, a coiled tubing that may contain a wireline or slickline within it, or a drill string that may contain a wireline or slickline within it. For example, the PL tool (300) may be powered by low-voltage PL cable, which transmits power from the surface.

PL tools may be adapted to traverse liners and selectively address (ground, excite, monitor) specific segments on demand from the inside of the well liners. A standard 1 11/16 inch housing diameter PL tool (300) would fit within a conductive liner with a diameter of, for example, 4 ½ inches. Customized bow-spring or 4-arm bow-spring centralizers may apply the electrical connection (322) to the inner diameter (ID) of liner segments (314). Such tools may be compatible with cartridges and logging heads with casing-collar locators (324) for depth control; and standard cased-hole telemetry may be appropriate for this low-data-rate measurement. The PL tool (300) may be operated with excitations of a volt (or maybe up to 10 V). The PL tool (300) may be operated in the time-or frequency-domain. For example, in the frequency-domain the PL tool (300) may operate in the frequency range between 1 Hertz and 1000 Hertz, with typical frequencies around 10 Hertz, and total currents injected into the reservoir may be on the order of tenths of an ampere (A) to a few amperes. Thus, it may be possible to operate within fairly standard cased-hole power budgets of a few tens of volt-amperes (V-A). A small-diameter coaxial cable may be used as a conveyance (318) to power these tools.

In some embodiments, such as the embodiments depicted in FIG. 3, the PL tool (300) may include one or more electrical connections (322) disposed along the length of the cylindrical housing (308). These electrical connections may make electrical contact with one or more conductive liner segments (314) causing these conductive liner segments (314) to be controlled by the PL tool (300) as on-demand electromagnetic source electrodes and on-demand electromagnetic receiver electrodes.

In the configuration shown in FIG. 3 the PL tool (300) may utilize the on-demand electromagnetic source electrodes and on-demand electromagnetic receiver electrodes to perform an electrical survey of a portion of the formation (306) surrounding a common hydrocarbon well (304) that contains both the on-demand source electrode and the on-demand receiver electrode, and determine at least one electrical characteristic of the portion of the formation (306) surrounding the wellbore (304) using the electrical survey.

Figure 4:
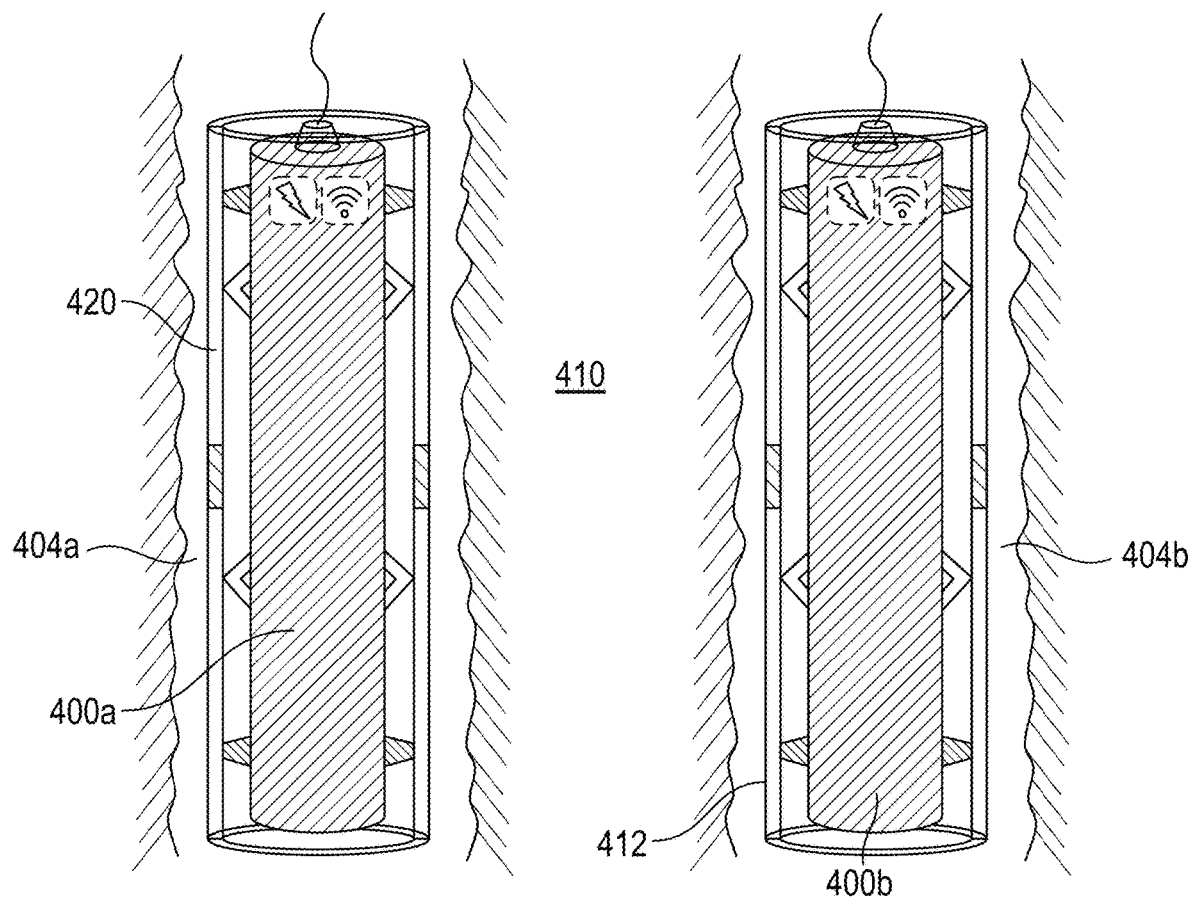
FIG. 4 depict an electrical survey geometry in accordance with one or more embodiments.

In other embodiments, as shown in FIG. 4 a first PL tool (400a) may be disposed in a first wellbore (404a) and a second PL tool (400b) may be disposed in a second wellbore (404b). The first PL tool (400a) may selectively convert a conductive segment of the liner in the first wellbore (404a) into an on-demand electromagnetic source electrode (420), while the second PL tool (400b) may selectively convert a conductive segment of the liner in the second wellbore (404b) into an on-demand electromagnetic receiver electrode (412). The configuration shown in FIG. 4 may be used to perform an electrical survey of the intervening formation (410).

Figure 5:
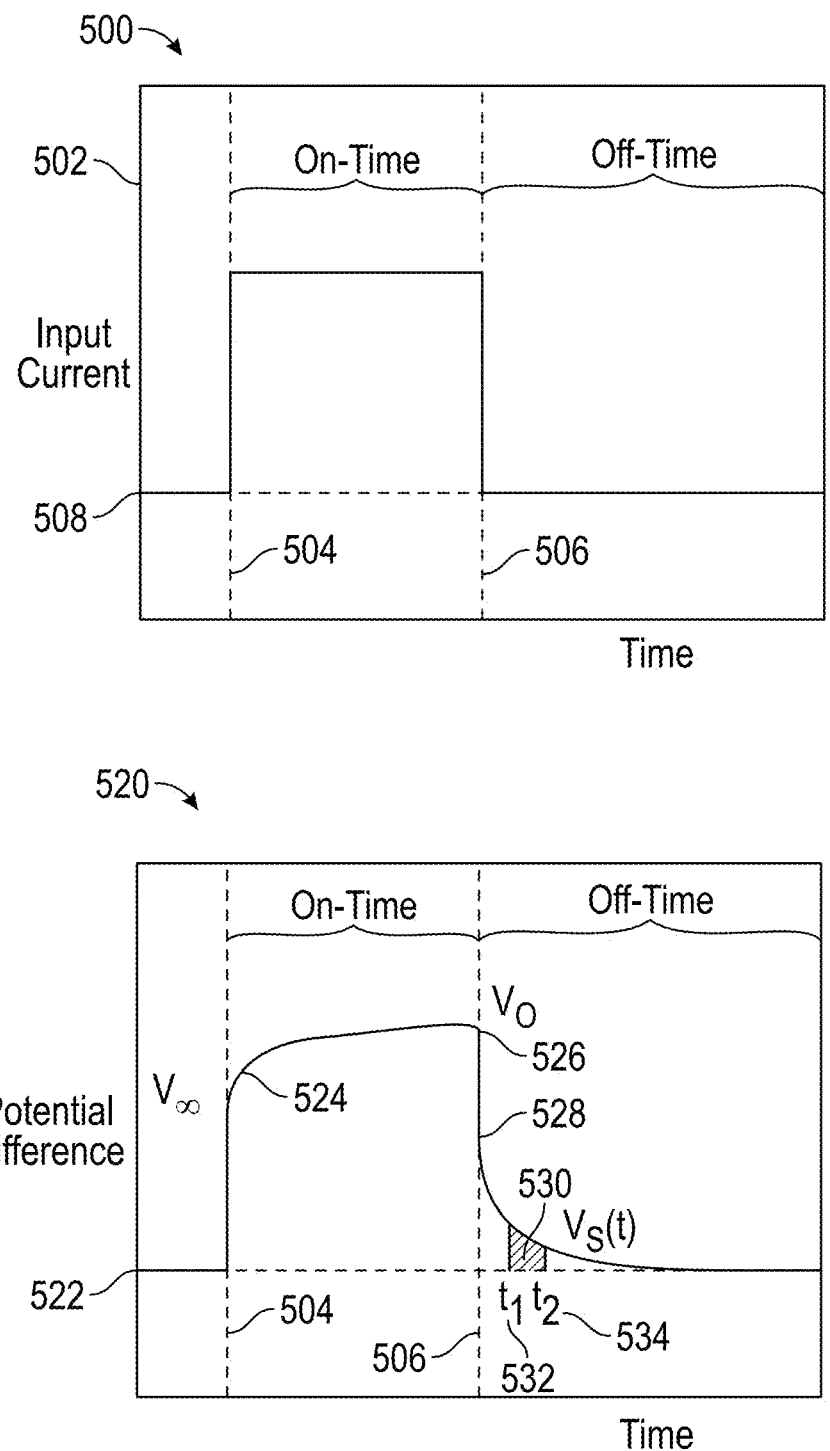
FIG. 5 illustrate electrical currents and voltages in accordance with one or more embodiments.

FIG. 5 shows the input (or driving) current (500) of an on-demand electromagnetic source electrode and the resulting measured voltage (or potential difference) (520) of an on-demand electromagnetic receiver electrode in accordance with one or more embodiments. In the example shown, the input current 500 takes one of two effectively constant values. During an "on-time" the current maintains an essentially constant non-zero value (502), $I_0$, beginning at a start time (504) and terminating at an end time (506). Outside the on-time, i.e., before the start time (504) and after the end time (506) the input current may be effectively zero (508). This period may be termed the "off-time".

In contrast, the voltage measured by the on-demand electromagnetic receiver electrode (520) has a more complex character. At the start time (504) the measured voltage jumps effectively instantaneously from a zero value (522) to a first voltage (524) that may be denoted $V_\infty$, before gradually increasing to a second (asymptote) voltage (526) that may be denoted $V_0$. At the end time (506) the measured voltage falls effectively instantaneously from $V_0$, to a third voltage (528) that may be denoted $V_S$, that then gradually decays over a period after the end time (506) to a zero voltage (522). The area under a portion (530) of the decay curve delimited by a first limit time denoted $t_1$, (532) and a second limit time denoted $t_2$ (534).

In accordance with one or more embodiments, the measured voltages may be used to determine an "apparent conductivity", σ:

$$\sigma = I_0 / (V_0 K) \quad \text{Equation (1)}$$

where K is a geometric factor used to account for the distance between the on-demand source electrode and the on-demand receiver electrode. Furthermore, the measured voltages may be used to determine an "apparent chargeability, M:

$$M = V_S / V_0 \quad \text{Equation (2)}$$

where $V_0$ and $V_S$ are the voltages immediately before and immediately after switching off the current to the on-demand source electrode, respectively.

Forward modeling of a deep EM survey includes, in one or more embodiments, solving a coupled system comprising Maxwell's equations and the constitutive equations for the rock formations using an assumed spatial distribution of resistivity and permittivity within the reservoir. The voltages and currents applied to the source electrodes are used as boundary conditions. The solution of the coupled system may in some embodiments involve the application of a finite-difference, or a finite-element algorithm to predict the EM fields detected by the receiver electrodes. In accordance, the solution of the coupled system may be achieved in the time-domain or in the frequency domain.

In other embodiments, particularly when the spatial distribution of resistivity and permittivity within the reservoir is highly symmetric, for example, layered or homogenous, Maxwell's equations and the constitutive equations may be simplified, and solved analytically or quasi-analytically.

Maxwell's Equations

Maxwell's equations are the governing equations of electromagnetic problems. They are a set of coupled partial differential equations that connect electric and magnetic fields and fluxes. We consider the quasistatic regime, ignoring the contribution of displacement current. We begin by considering the first order quasi-static EM problem in the time domain:

$$\vec{\nabla} \times \vec{e} + \frac{\partial \vec{b}}{\partial t} = \vec{s_m}, \quad \text{Equation (3)}$$

$$\vec{\nabla} \times \vec{h} - \vec{j} = \vec{s_e}, \quad \text{Equation (4)}$$

where $\vec{e}$ and $\vec{h}$ are the electric and magnetic fields, $\vec{b}$ is the magnetic flux density, $\vec{j}$ is the current density, and $\vec{s_m}$ and $\vec{s_e}$, are the magnetic and electric source terms, respectively. $\vec{s_e}$ is the physical, electric current density, while $\vec{s_m}$ is the "magnetic current density". Although $\vec{s_m}$ is unphysical, as continuity of the magnetic current density would require magnetic monopoles, the definition of a magnetic source term may be a useful conceptual construct, well known in the art (see e.g., "*Electromagnetic Theory for Geophysical Applications. In: Electromagnetic Methods in Applied Geophysics*", Society of Exploration Geophysicists, Ch. 4, pp. 130-311, 1st Edition. Ward and Hohmann, 1988).

By applying the Fourier Transform (using the $e^{i\omega t}$ convention), we can write Maxwell's equations in the frequency domain:

$$\vec{\nabla} \times \vec{E} + i\omega \vec{B} = \vec{S_m}, \quad \text{Equation (5)}$$

-continued $$\vec{\nabla} \times \vec{H} - \vec{J} = \vec{S_e}, \quad \text{Equation (6)}$$

where the uppercase letters denote frequency domain equivalents of the lower case time domain variables. The fields and fluxes are related through the physical properties: electrical conductivity σ, and magnetic permeability μ, as described by the constitutive relations:

$$\vec{J} = \sigma \vec{E}, \quad \text{Equation (7)}$$

$$\vec{B} = \mu \vec{E}. \quad \text{Equation (8)}$$

The physical properties, σ and μ are typically spatially heterogeneous. For isotropic materials, σ and μ are scalars, while for anisotropic materials they are 3×3 symmetric positive definite tensors. The same constitutive relations can be applied in the time domain provided that the physical properties, σ, μ are not frequency-dependent.

In an EM geophysical survey, an electromagnetic source electrode, such as on-demand electromagnetic source electrode, provides the input energy to excite responses that depend on the physical property of the subsurface formation. In simulating the electromagnetic response of the subsurface formation using equations (5)-(8), or equations (3)-(4) and (7)-(8), the physical properties may be stored in a map of the electrical properties of the subsurface. Such a map may be a three-dimensional (3D) gridded representation of the electrical properties at sample points within the subsurface.

When performing electromagnetic surveys these responses, electric and magnetic fields and fluxes, may be sampled by electromagnetic receiver electrodes, such as on-demand electromagnetic receiver electrodes to give the measured or observed data. When simulating electromagnetic surveys these responses, electric and magnetic fields and fluxes, may be calculated using Maxwell's Equations for electromagnetic receiver electrodes, such as on-demand electromagnetic receiver electrodes, to give the predicted or simulated data The simulation of Maxwell's equations may be conducted in either the time or frequency domain, depending on the nature of the source. Harmonic waveforms are naturally represented in the frequency domain, while transient waveforms are more naturally described in the time domain.

Figure 6:
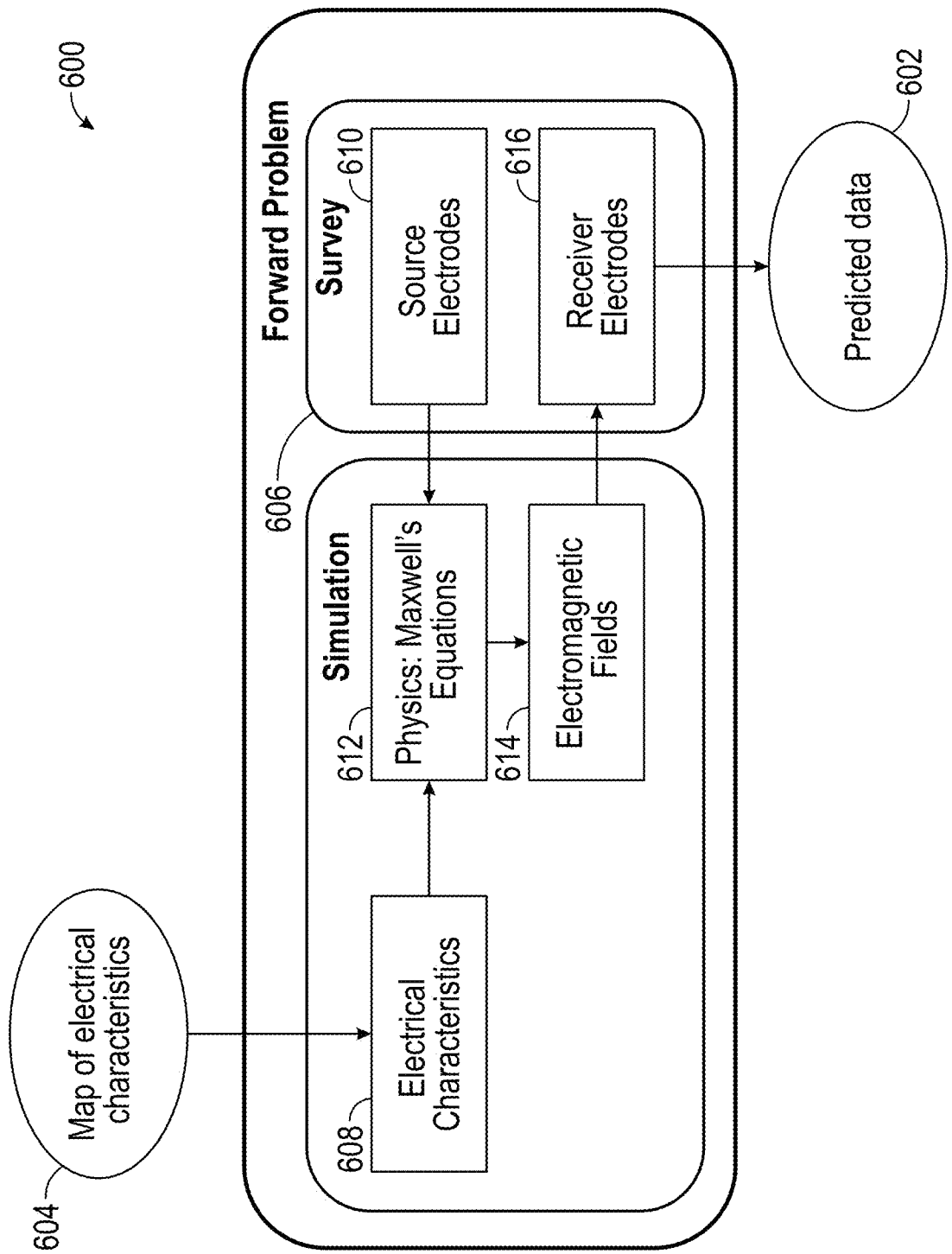
FIG. 6 shows a flowchart in accordance with one or more embodiments.

FIG. 6 depicts a flowchart (600) illustrating the simulation of predicted data (602) from a known or assumed map of the electrical characteristics of a subsurface region (604) and the survey geometry (606) The electrical characteristics (608) of each portion of the subsurface typically in the form of a grid of points spatially discretizing the subsurface are read into the simulation. Furthermore, the location and size of the source electrodes (610), such as the on-demand electromagnetic source electrodes, are read into the simulations. The electrical characteristics (608) and the source electrode (610) geometry fully constrain the physics of the simulation and Maxwell's Equations (612) may then be solved. In some embodiments, Maxwell's Equations may be solved in the time domain, while in other embodiments Maxwell's Equation may be solved in the frequency domain. In the time domain, Maxwell's equations may frequently be solved using an iterative time-stepping technique such as finite-differences or finite-elements.

The solution of Maxwell's Equations gives the electromagnetic fields (614) for the portion of the subsurface region spanned by the simulation and for the duration of the simulation. The geometry, i.e., the location and size, of the receiver electrodes (616) may then be employed to sample the electromagnetic fields (614) at the location of the receiver electrodes (61) yielding the predicted data (602). In some embodiments, the predicted data (602) may take the form of voltages as a function of time, while in other embodiments the predicted data (602) may take the form of apparent conductivities and apparent chargeabilities.

Solving Maxwell's Equations to obtain the response of the electromagnetic receiver electrodes for a known or assumed map of electrical properties of the subsurface is typically called solving the "forward problem". However, it is frequently more interesting, useful and commercially valuable, to estimate a map of unknown electrical properties of the subsurface from a known response of the electromagnetic receiver electrodes. The problem of estimating a map of unknown electrical properties of the subsurface is typically called the "inverse problem".

The aim of the inverse problem is to find a model or map, m (which may be gridded, voxel-based or a parametric representation) that is consistent with the measured or observed data and with prior knowledge and assumptions about the model. Various types of prior knowledge and/or assumptions may be included in the inverse problem. For example, prior knowledge may take the form of hard bounds, such as conductivity must be greater than, or equal to, zero. Alternatively, prior knowledge may be incorporated as probabilities making it more likely that the estimated value of the model or map, m lies close to an expected value, $m_0$.

The inverse problem may frequently be approached using a gradient-based technique, such as a steepest-descent method, a conjugate-gradient method, or a Gauss-Newton method. These gradient-based technique require an iterative process involving four steps. The first step involves the solving of the forward problem for a candidate map of the electrical characteristics of the subsurface to obtain predicted or simulated data. The second step involves forming an objective function (sometimes also called a "cost function" or "utility function") that measures the difference between the simulated data and measured or observed data. In the third step an extremum of the objective function, $\mathcal{F}$, may be found. Typically, the extremum is a minimum, corresponding to the closest fit between the measured data and the simulated data achievable at the current iteration. However, the objective may often be alternatively formulated such that a maximum indicates the closest fit. For example, a minimum of a first objective function $\mathcal{F}_1$ corresponds to a maximum of a second objective function $\mathcal{F}_2 = 1/\mathcal{F}_1$. Finally, in the fourth step, the candidate map may be updated or replaced by the map that produced the extremum of the objective function in the previous step. Unless the solution to the inverse problem is deemed to have converged, the four step process is repeated using the updated candidate map as the starting point.

The inverse problem may requires two abilities of the forward simulation: first, the ability to compute predicted data, $D_{pred}$, given a map or model, m:

$$D_{pred} = G[m] \quad \text{Equation (7)}$$

and, second, the ability to compute or determine the sensitivity of the predicted data to changes in the map or model, m, given by:

$$J[m] = \frac{\partial G[m]}{\partial m}. \qquad \text{Equation (8)}$$

To employ some iterative optimization techniques, particularly second order optimization techniques, may also require the adjoint of the sensitivity, $J^T$. These two elements, when combined may enable data to be simulated and gradient-based inversions to be run.

Figure 7:
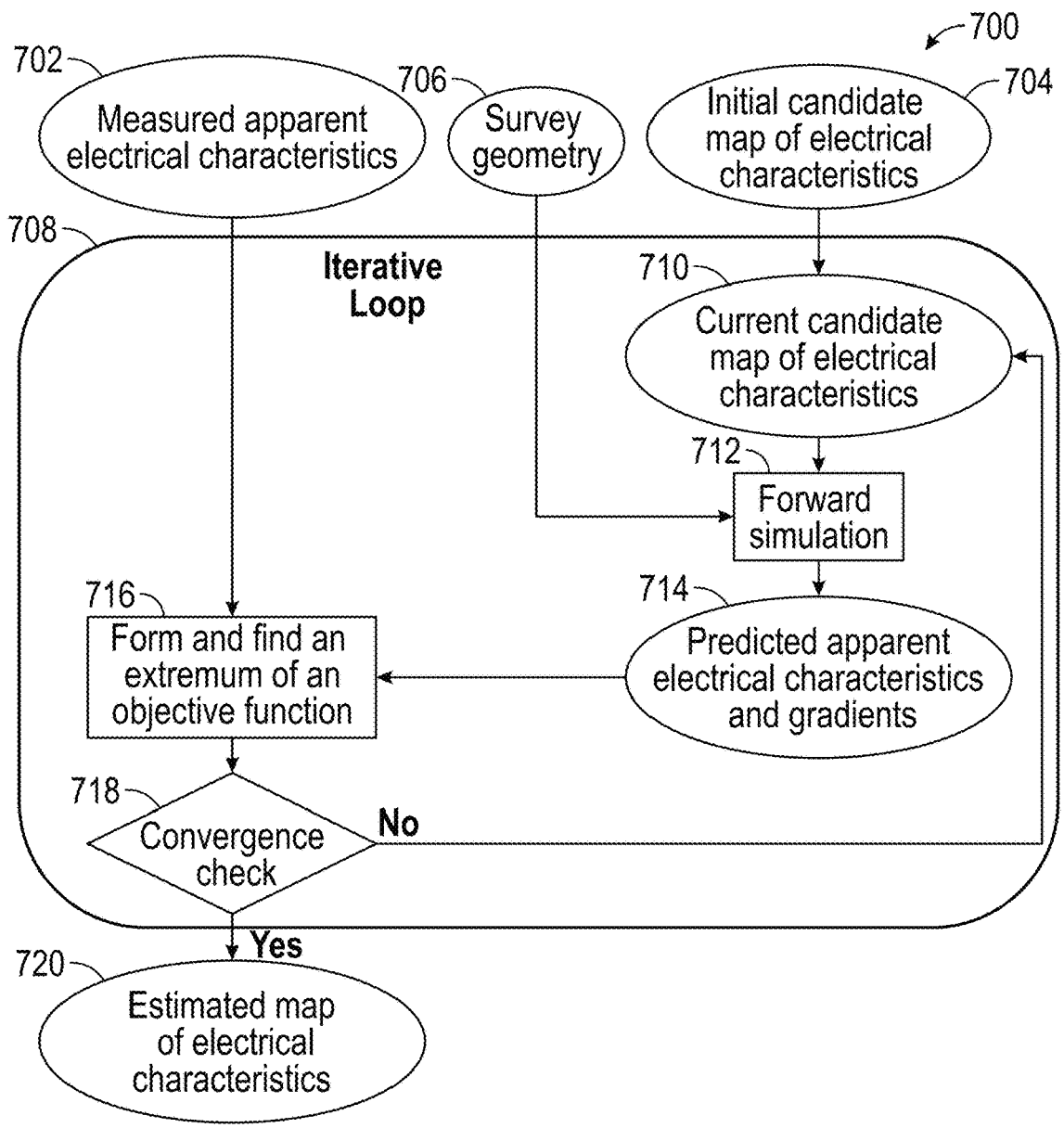
FIG. 7 shows a flowchart in accordance with one or more embodiments.

FIG. 7 depicts a flowchart (700) illustrating an inversion method in accordance with one or more embodiments. The input to the workflow depicted by the flowchart (700) include the measured apparent electrical characteristics (702), the survey geometry (706), i.e., the location of the on-demand electromagnetic source and receiver electrodes, and an initial candidate map of the electrical characteristics of a portion of the subsurface (704). In some cases, the initial candidate map (704) may be determined from previous electrical measurements, such as survey electromagnetic measurements or well logging electrical measurements. In other cases, a homogenous initial candidate may (704) be used, i.e., the electrical properties are initially taken to be uniform in space.

In some embodiments, the measured electrical characteristics (702), the survey geometry (706), and the initial candidate map of the electrical characteristics of a portion of the subsurface (704) may entered into an iterative inversion loop (708). Within the iterative inversion loop (708) the initial candidate map (704) initiates a current candidate map of electrical characteristics (710). In some embodiments, the current candidate map (710) is set equal to the initial candidate map (704). In other embodiments, the initial candidate map (704) may be filtered or smoothed to provide the current candidate map (710). The current candidate map (710) and the survey geometry (706) may then be used to perform forward simulation or forward modeling (712). For example, the forward simulation may be performed as described in the flowchart (600). The result of the forward simulation (712) may be predicted data. In particular, the predicted data may be predicted apparent electrical characteristics and the gradients of the predicted electrical characteristics with respect to perturbations of the candidate electrical characteristics (714).

In accordance with one or more embodiments, the measured apparent electrical characteristics (702) and the predicted apparent electrical characteristics and the gradients of the same (714) may be used to form and find an extremum of an objective function (716). The objective function may be formed to measure a difference between the measured and predicted apparent electrical characteristics. For example, the objective function may be a least-squares difference between the measured and predicted apparent electrical characteristics summed over all the on-demand electromagnetic source electrodes and receiver electrodes. In some cases, the objective function may be formulated such that a minimum of the objective function corresponds to the best available fit between the measured and predicted apparent electrical characteristics. In other cases, the objective function may be formulated such that a maximum of the objective function corresponds to the best available fit between the measured and predicted apparent electrical characteristics.

Finding an extremum, either a maximum or a minimum depending on the form of the objective function used, corresponds to finding an update to the current candidate map (710) that produces predicted data that locally optimizes the fit to the measured data. However, because the inversion problem may be non-linear the forward simulation may have to be repeated to find a global optimal fit. Thus, a convergence check (718) may be performed to determine if the predicted apparent electrical characteristics fit the measured apparent electrical characteristics. If an adequate fit has been achieved the estimated map of electrical characteristics (720) may be determined from the current candidate map, and the process terminated. However, if an adequate fit has not been achieved then the current candidate map may be updated based upon the extremum of the objective function determined in step (716) and the iterative loop (708) repeated recursively.

The convergence check may take a number of different forms, and the form chosen in any embodiment should not be regarded as limiting the scope of the invention. For example, the convergence check may be a comparison of the value of the objective function with a predetermined threshold value. In this case the iterative process may be deemed to have converged when the value of the objective falls below some predetermined value. In other cases the comparison check may be based on the rate of decrease of the value of the objective function between one iterative loop and the next. In this example, the iterative process may be deemed to have converged when the value of the objective function ceases to decrease by a meaningful amount between one iteration and the next. In yet another example, the convergence check may be simply the completion of a fixed number of loops of the iterative loop. The convergence check may consist of any one of these or other conditions known to a person of ordinary skill in the art alone or in combination. For example, the iterative loop may terminate as soon as the value of the objective function ceases to decrease by more than 5% of its value with each iteration of the loop, or after 20 iterations whichever occurs first.

In accordance with one or more embodiment, the inverted electrical characteristic of the subsurface region may include conductivity, $\sigma$, and chargeability of the formation, M. In particular, the inverted electrical characteristics may include a chargeability map, denoted $M(r)$ and a conductivity map $\sigma(r)$ that describe the chargeability and conductivity, respectively, as a function of spatial position, r. In some embodiments, the spatial position may be a three-dimensional spatial position, such as North-South, East-West, and depth, while in other embodiments the spatial position may be only a two-dimensional, such as North-South and East-West or one horizontal spatial position and depth. Typically, the values of $M(r)$ and $\sigma(r)$ may be determined at grid points sampling the subsurface region.

In accordance with one or more embodiments, maps of at least one in situ formation property may be determined from the chargeability map, $M(r)$, and the conductivity map $\sigma(r)$. For example, a map of the water saturation, $S_w(r)$, of the subsurface region may be determined by:

$$S_w(r) = \left( \frac{aQ_s\lambda}{M(r)\sigma_w} \right), \qquad \text{Equation (9)}$$

where a, is a constant of proportionality for specific surface area and porosity, $Q_s$ is the surface charge density, $\lambda$, is the counterion mobility for polarization, and $\sigma_w$ is the pore fluid conductivity. Each of a, $Q_s$, $\lambda$, and $\sigma_w$ may be determined from analysis of core samples taken from the subsurface region during drilling using methods familiar to a person of ordinary skill in the art or obtained literature familiar to a person of ordinary skill in the art.

In accordance with other embodiments, a map of the porosity, φ(r), may be determined:

$$\varphi(r) = \left(\frac{\sigma(r)}{S_w(r)^n \sigma_w}\right)^{1/m} \quad \text{Equation (10)}$$

where n is a saturation exponent and m is a cement exponent. Both obtain from literature or rock core measurements. Both n, and m may be determined from analysis of core samples taken from the subsurface region during drilling using methods familiar to a person of ordinary skill in the art or obtained literature of the art.

One or more embodiments may be illustrated by the following synthetic examples. Synthetic examples are commonly used in the development of geophysical processing methods, such as the disclosed embodiments. They complement measured or "field" data in two ways. Firstly, unlike measured data where the actual geophysical structure of the subsurface may be unknown, in synthetic examples the subsurface structure is defined and precisely known. Secondly, measured data may be unavailable and/or expensive to collect, whereas synthetic data is typically much less expensive to generate. Synthetic examples, may further be defined to be one dimensional, two dimensional, or three dimensional. Synthetic examples may form crucial stepping stones in developing, testing and demonstrating proof of concept for new methods.

Figure 8A:
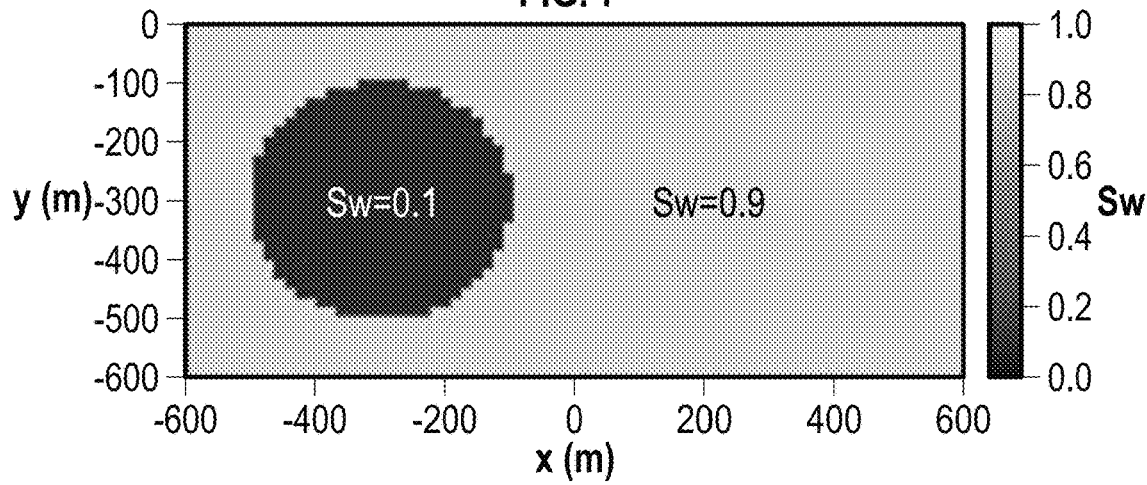
FIGS. 8A and 8B depict defined formation properties used as input to a synthetic example.
Figure 8B:
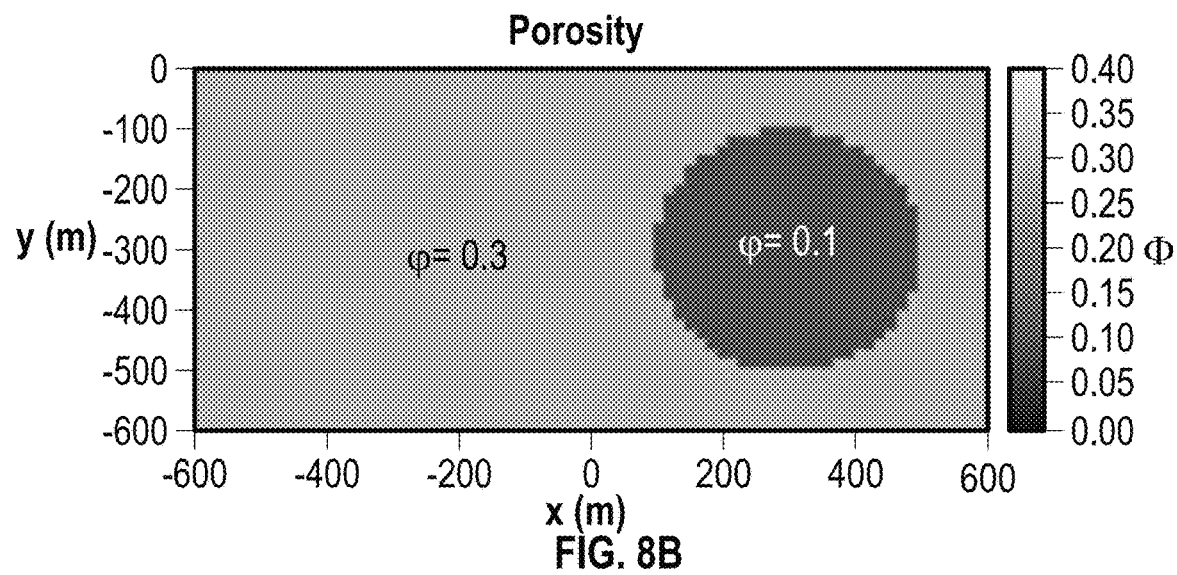

Typically, a synthetic example begins with defined model of the subsurface specifying the geophysical characteristics as a function of position. In this case, the water saturation and porosity may be defined. True (defined) water saturation is shown in FIG. 8A displayed against depth, indicated by the vertical axis (802) and horizontal location indicated on the horizontal axis (804). The water saturation is indicated on a grayscale (806). In this synthetic example the water saturation is a uniform 0.9, or 90%, except within a circular region (808) where it is 0.1 or 10%. Similarly, FIG. 8B shows the true (defined) porosity displayed on the same depth and horizontal axes. The porosity is displayed on a grayscale (810) and is a constant 0.3, or 30%, everywhere, except with a circular zone (812) where porosity is 0.2, or 10%.

Figure 8C:
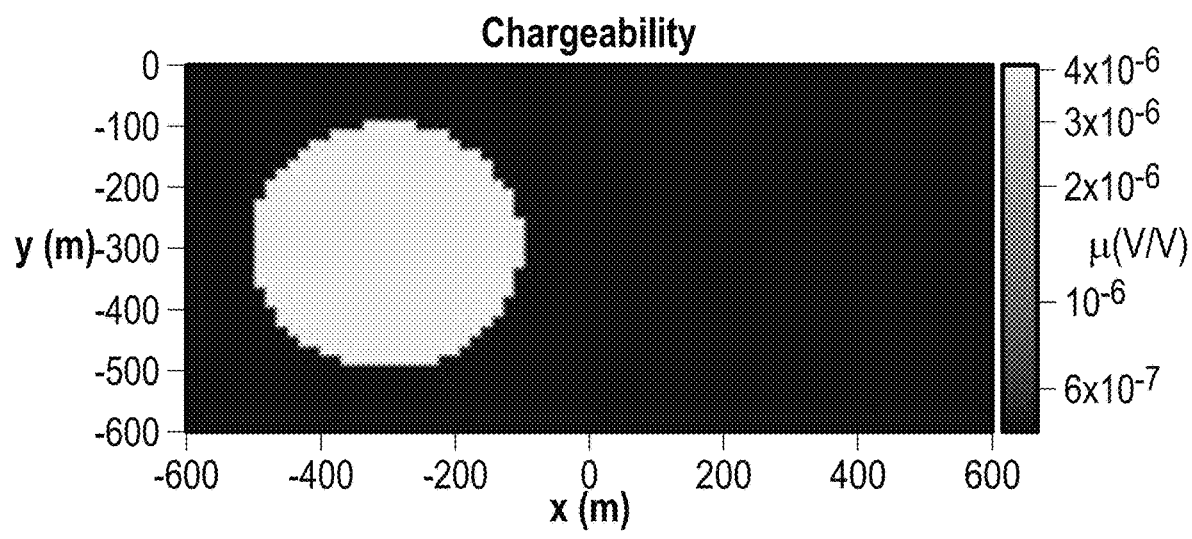
FIGS. 8C and 8D depict maps of electrical properties determined from the formation properties within the synthetic example.
Figure 8D:
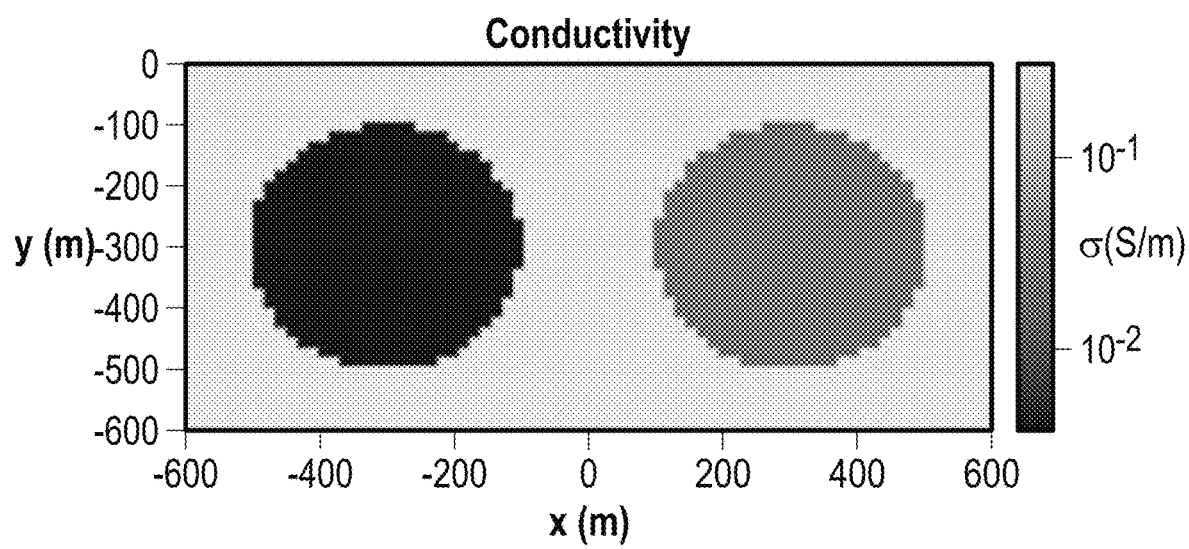

FIG. 8C shows the chargeability predicted using forward modeling from the water saturation shown in FIG. 8A and the porosity shown in FIG. 8B. The chargeability is indicated on a grayscale (814) and is relatively low everywhere except within the circular zone (816). Similarly, FIG. 8D shows the conductivity predicted from the water saturation shown in FIG. 8A and the porosity shown in FIG. 8B.

Figure 9A:
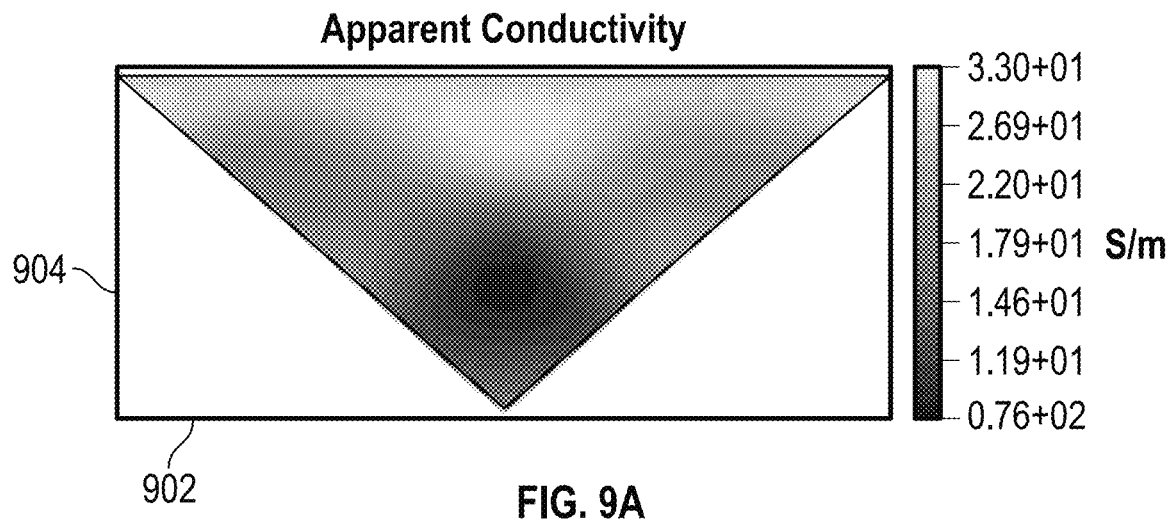
FIGS. 9A and 9B depict synthetic data determined using forward modeling.
Figure 9B:
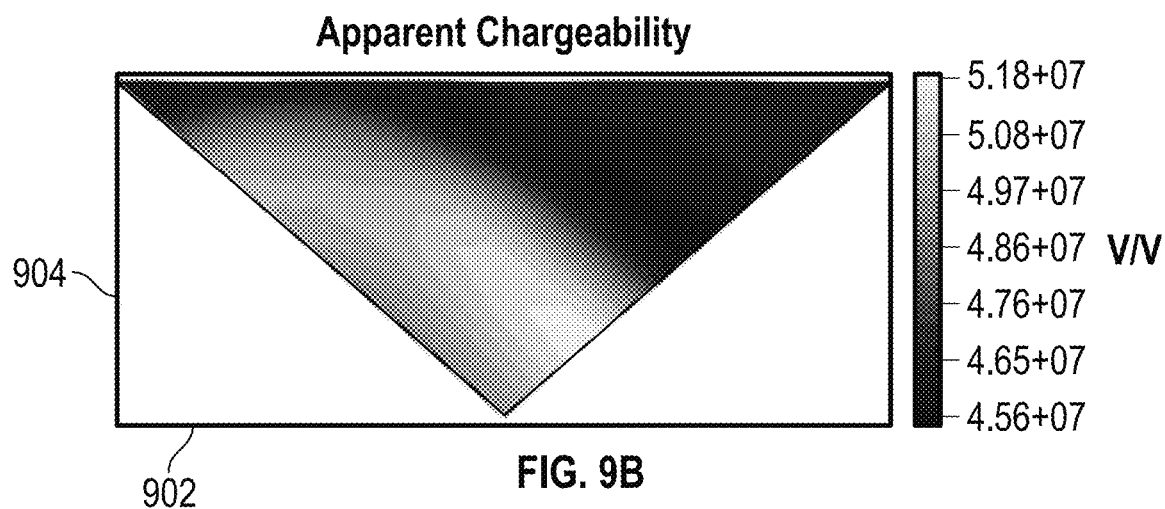

Using the map of chargeability (shown in FIG. 8C) and map of conductivity (shown in FIG. 8D), forward modeling may be used to generate synthetic data using the workflow shown in FIG. 6. To generate synthetic data further requires a survey geometry, i.e., the location of the electromagnetic source electrodes and the electromagnetic receiver electrodes. In this synthetic example, the electrode locations are shown by "x marks", such as x-mark (820) on the upper horizontal axis (822) of FIG. 8A. The resulting synthetic data in the form of apparent conductivity is shown in FIG. 9A and apparent chargeability in FIG. 9B. Both apparent conductivity and apparent chargeability are displayed against positions within the wellbore on the horizontal axis (902) and source-receiver separation in the vertical axis (904). The apparent conductivity is indicated by a grayscale (906) and the apparent chargeability is indicated by the grayscale (908). In this synthetic example the apparent conductivity and the apparent chargeability have been generated using forward modeling from defined maps of the subsurface electrical properties, represent and take the place of measured field data in the application of one of the embodiments described below.

Figure 10A:
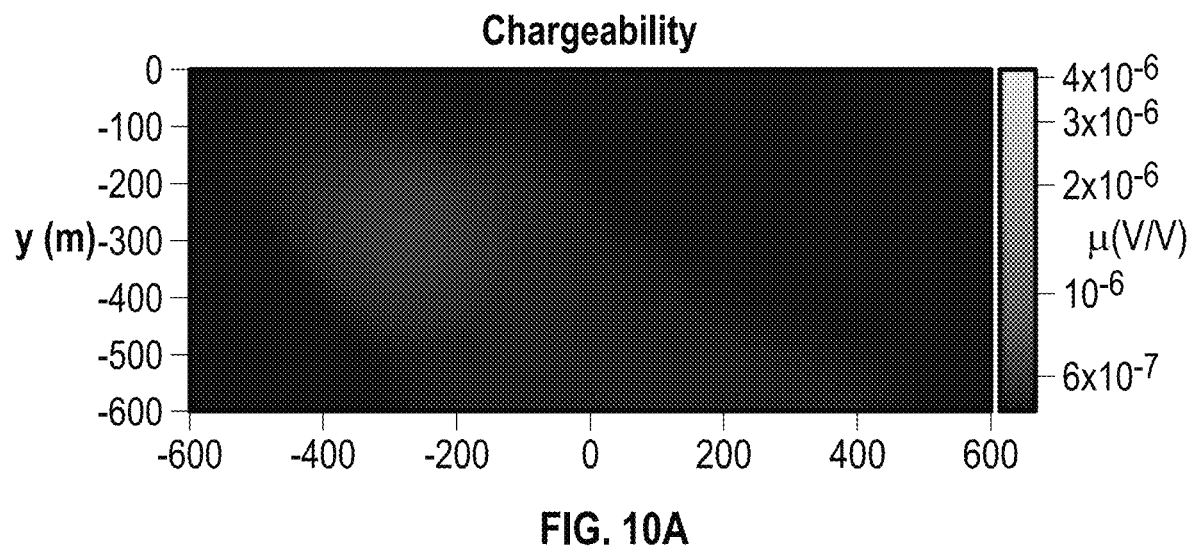
FIGS. 10A-10D depict maps of estimated electrical characteristics in accordance with one or more embodiments.
Figure 10B:
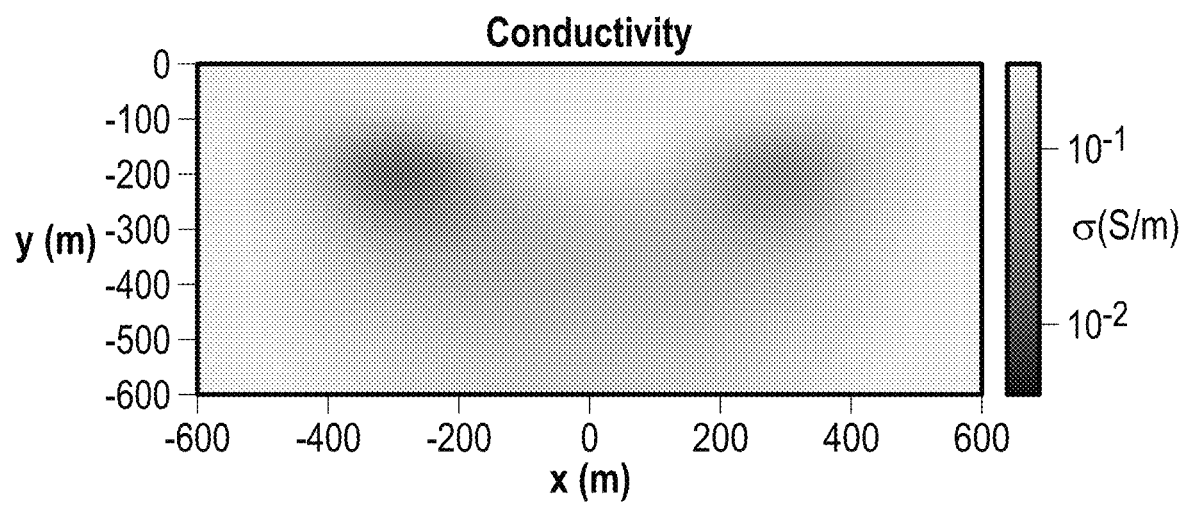

FIG. 10A and FIG. 10B display maps of the chargeability and maps of the conductivity of the subsurface region, respectively, estimated using the inversion method (700) depicted in FIG. 7. FIGS. 10A and 10B are displayed against depth indicated by the vertical axis (802) and horizontal location indicated on the horizontal axis (804). FIG. 10A may be compared to FIG. 8C, the defined or "true" chargeability, and FIG. 10B may be compared to FIG. 8D, the defined or "true" conductivity. If the disclosed method were perfect FIG. 10A would be identical to FIG. 8C and FIG. 10B would be identical to FIG. 8D.

Figure 10C:
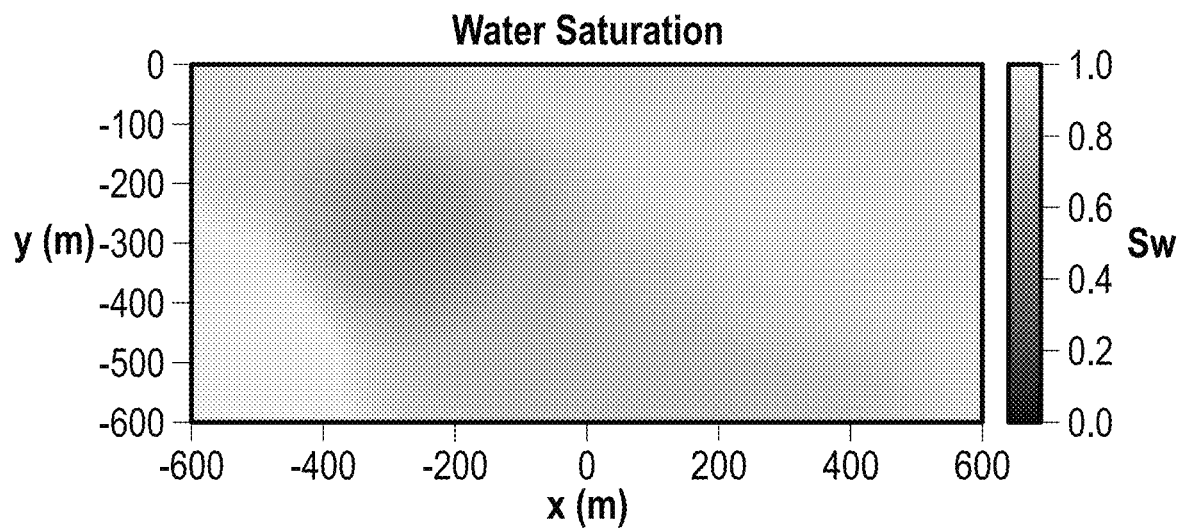
Figure 10D:
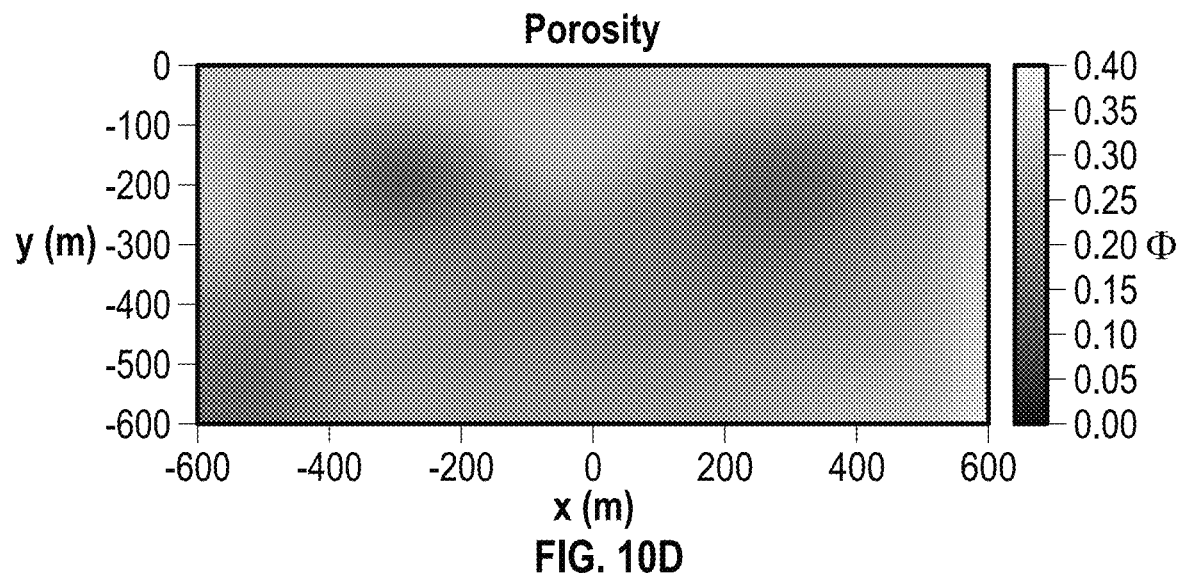

FIG. 10C shows a map of estimated water saturation obtained from the chargeability map shown in FIG. 10A using Equation (9), and FIG. 10D shows a map of estimated porosity obtained from the map of estimated water saturation, shown in FIG. 10C, and the map of estimated conductivity, shown in FIG. 10B, using Equation (10).

Figure 11:
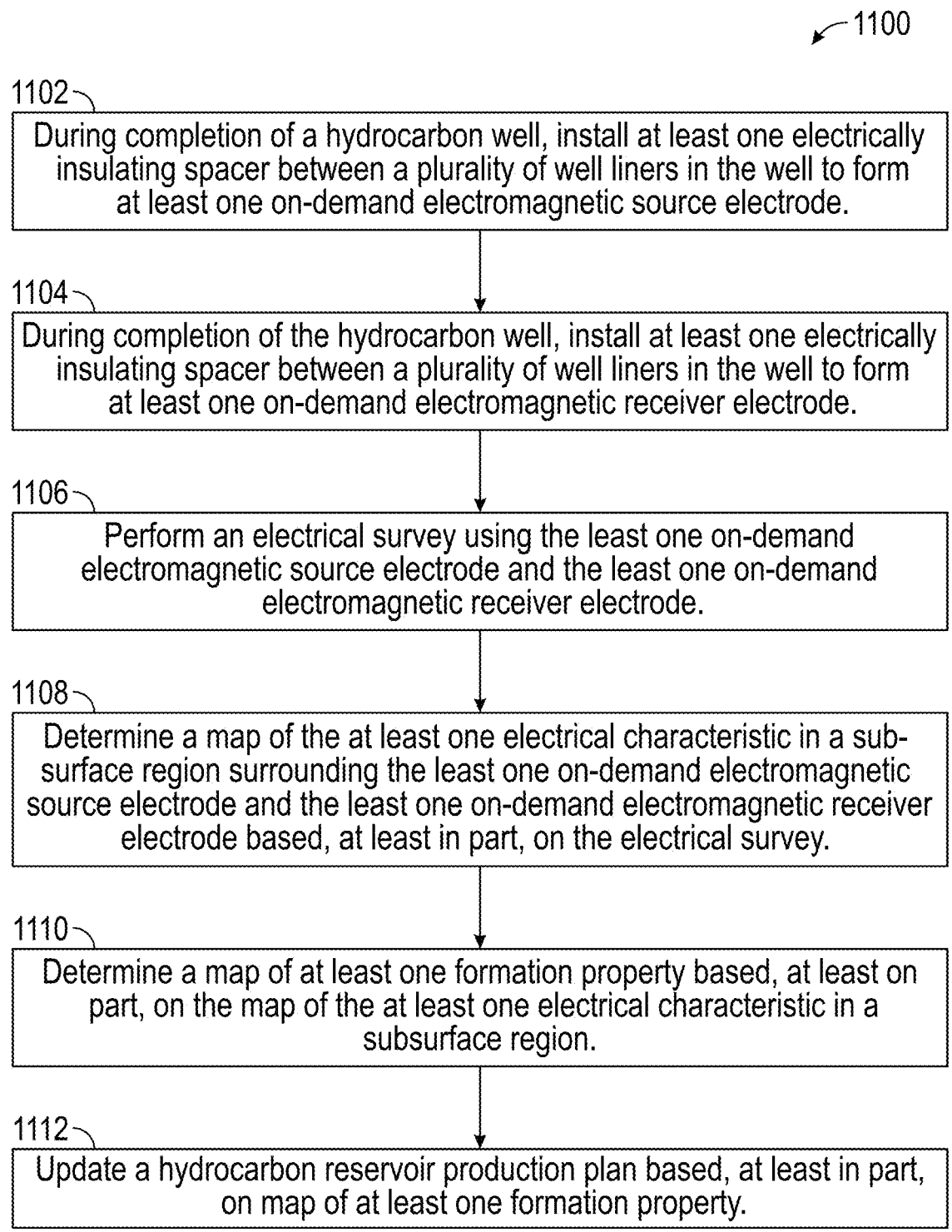
FIG. 11 depicts a flowchart in accordance with one or more embodiments.

FIG. 11 depicts a flowchart in accordance with one or more embodiments. In Step (1102) during completion of a hydrocarbon well, at least one electrically insulating spacer may be installed between a plurality of well liners in the well to form at least one on-demand electromagnetic source electrode. In Step 1004, during completion of the hydrocarbon well, at least one electrically insulating spacer may be installed between the plurality of well liners in the well to form at least one on-demand electromagnetic receiver electrode. In accordance with some embodiments, the on-demand electromagnetic source electrode, and the on-demand electromagnetic receiver electrode may be located in the same wellbore. In accordance with other embodiments, the on-demand electromagnetic source electrode, and the on-demand electromagnetic receiver electrode may be located in different wellbores.

In Step (1106) an electrical survey may be performed using the at least one on-demand electromagnetic source electrode and the at least one on-demand electromagnetic receiver electrode. Performing the electrical survey may include measuring at least one apparent electrical characteristic of the subsurface formation. In some embodiments, the at least one apparent electrical characteristic may include an apparent conductivity and an apparent chargeability. In some embodiments, performing the electrical survey further may include controlling, using a well logging tool, a source voltage and a source current of the on-demand electromagnetic source electrode and monitoring a receiver voltage and a receiver current from the on-demand electromagnetic receiver electrode. Further, performing the electrical survey may include converting, using the well logging tool, the plurality of well liners by selectively addressing at least two well liners by making electrical contact with the at least the one on-demand source electrode and the at least one on-demand receiver electrode. Still further, performing the electrical survey further may include receiving a plurality of signals from a global navigation satellite system, wherein the plurality of signals provide a common reference phase for the source current and the receiver current.

In Step (1108) a map of the at least one electrical characteristic in a subsurface region surrounding the least one on-demand electromagnetic source electrode and the least one on-demand electromagnetic receiver electrode may be determined from the electrical survey. The determination may be performed using a computer system such as the computer system depicted in FIG. 12. Determining the map of the at least one electrical characteristic may be performed using the inversion method presented in FIG. 7. The inversion method may include obtaining a candidate map of the at least one electrical characteristic and simulating the at least one apparent electrical characteristic using the candidate map. The inversion method may further include forming an objective function based, at least in part, on the at least one simulated apparent electrical characteristic and the at least one measured electrical characteristic, and determining, the map of the at least one electrical characteristic by updating the candidate map based on finding an extremum of the objective function. The resulting map of the at least one formation property may be a one-dimension, two-dimensional, or three-dimensional depiction of the formation property within the subsurface region. The determination may be performed using a computer system such as the computer system depicted in FIG. 12.

In Step (1110) a map of at least one formation property may be determined based, at least on part, on the map of the at least one electrical characteristic in a subsurface region. For example, a map of estimated water saturation may be obtained using Equation (9), and a map of estimated porosity may be obtained using Equation (10).

In Step (1112) a hydrocarbon reservoir production plan may be update based, at least in part, on map of at least one formation property. A hydrocarbon reservoir production plan may be routinely produced by the owner, or operator of a hydrocarbon reservoir. The plan specifies intended future operations with the goal of producing hydrocarbon at a desired volume rate and/or the desired total produced volumes of hydrocarbons before the productive economic life of the reservoir terminates. The potential operations include, without limitation, the drilling of new wells, the stimulation, such as hydraulic fracturing, or acidizing, of existing well, the installation of surface or downhole pumps, and the injection of fluids such as water to maintain reservoir pressure and "sweep" hydrocarbons towards producing wells. The plan is formed within technical, such as the maximum possible length of well, and economic constraints, such as the available capital investment. The plan may be periodically revised and updated as technical and economic constraints change, and additional geophysical and production data become available. For example, observed production rates may be lower than anticipated by the plan and a decision to stimulate a well may be taken. The selection of which well, or which portion of a well to stimulate may be made based upon the determination of subsurface regions of high porosity and low water (and hence high hydrocarbon) saturation achieved using embodiments disclosed. Thus, disclosed embodiments are incorporated into the existing process of updating the hydrocarbon reservoir production plan and further into the process of executing operational steps contained within the plan. Further, he enclosed embodiments are improvements over updating the hydrocarbon reservoir production plan in the absence of detailed porosity and saturation maps of the subsurface, and improvements over performing electromagnetic surveys by a convention method. For example, the disclosed embodiments may both be less expensive and provide higher resolution than conventional methods.

Figure 12:
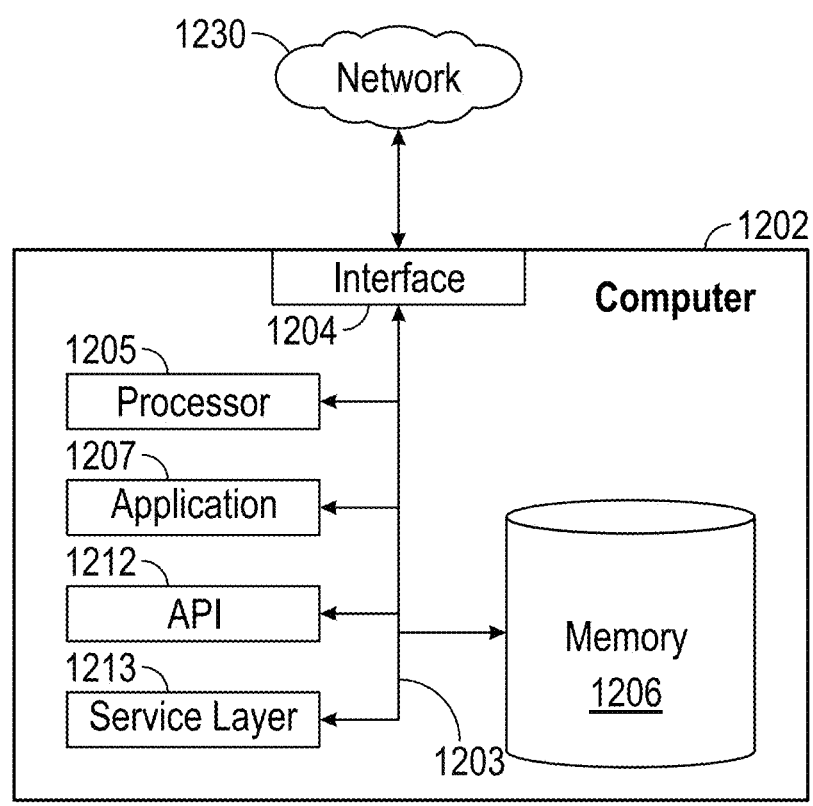
FIG. 12 shows a computer system in accordance with one or more embodiments.

Embodiments may be implemented on a computer system. FIG. 12 is a block diagram of a computer system (1202) used to provide computational functionalities associated with described algorithms, methods, functions, processes, flows, and procedures as described in the instant disclosure, according to an implementation. The illustrated computer (1202) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (1202) may include a computer that includes an input device, such as a keypad, keyboard, touch screen, or other device that can accept user information, and an output device that conveys information associated with the operation of the computer (1202), including digital data, visual, or audio information (or a combination of information), or a GUI.

The computer (1202) can serve in a role as a client, network component, a server, a database or other persistency, or any other component (or a combination of roles) of a computer system for performing the subject matter described in the instant disclosure. The illustrated computer (1202) is communicably coupled with a network (1230). In some implementations, one or more components of the computer (1202) may be configured to operate within environments, including cloud-computing-based, local, global, or other environment (or a combination of environments).

At a high level, the computer (1202) is an electronic computing device operable to receive, transmit, process, store, or manage data and information associated with the described subject matter. According to some implementations, the computer (1202) may also include or be communicably coupled with an application server, e-mail server, web server, caching server, streaming data server, business intelligence (BI) server, or other server (or a combination of servers).

The computer (1202) can receive requests over network (1230) from a client application (for example, executing on another computer (1202) and responding to the received requests by processing the said requests in an appropriate software application. In addition, requests may also be sent to the computer (1202) from internal users (for example, from a command console or by other appropriate access method), external or third-parties, other automated applications, as well as any other appropriate entities, individuals, systems, or computers.

Each of the components of the computer (1202) can communicate using a system bus (1203) In some implementations, any or all of the components of the computer (1202), both hardware or software (or a combination of hardware and software), may interface with each other or the interface (1204) (or a combination of both) over the system bus (1203) using an application programming interface (API) (1212) or a service layer (1213) (or a combination of the API (1212) and service layer (1213). The API (1212) may include specifications for routines, data structures, and object classes. The API (1212) may be either computer-language independent or dependent and refer to a complete interface, a single function, or even a set of APIs. The service layer (1213) provides software services to the computer (1202) or other components (whether or not illustrated) that are communicably coupled to the computer (1202). The functionality of the computer (1202) may be accessible for all service consumers using this service layer. Software services, such as those provided by the service layer (1213), provide reusable, defined business functionalities through a defined interface. For example, the interface may be software written in JAVA, C++, or other suitable language providing data in extensible markup language (XML) format or other suitable format. While illustrated as an integrated component of the computer (1202), alternative implementations may illustrate the API (1212) or the service layer (1213) as stand-alone components in relation to other components of the computer (1202) or other components (whether or not illustrated) that are communicably coupled to the computer (1202). Moreover, any or all parts of the API (1212) or the service layer (1213) may be implemented as child or sub-modules of another software module, enterprise application, or hardware module without departing from the scope of this disclosure.

The computer (1202) includes an interface (1204). Although illustrated as a single interface (1204) in FIG. 12, two or more interfaces (1204) may be used according to particular needs, desires, or particular implementations of the computer (1202). The interface (1204) is used by the computer (1202) for communicating with other systems in a distributed environment that are connected to the network (1230). Generally, the interface (1204) includes logic encoded in software or hardware (or a combination of software and hardware) and operable to communicate with the network (1230). More specifically, the interface (1204) may include software supporting one or more communication protocols associated with communications such that the network (1230) or interface's hardware is operable to communicate physical signals within and outside of the illustrated computer (1202).

The computer (1202) includes at least one computer processor (1205). Although illustrated as a single computer processor (1205) in FIG. 12, two or more processors may be used according to particular needs, desires, or particular implementations of the computer (1202). Generally, the computer processor (1205) executes instructions and manipulates data to perform the operations of the computer (1202) and any algorithms, methods, functions, processes, flows, and procedures as described in the instant disclosure.

The computer (1202) also includes a memory (1206) that holds data for the computer (1202) or other components (or a combination of both) that can be connected to the network (1230). For example, memory (1206) can be a database storing data consistent with this disclosure. Although illustrated as a single memory (1206) in FIG. 12, two or more memories may be used according to particular needs, desires, or particular implementations of the computer (1202) and the described functionality. While memory (1206) is illustrated as an integral component of the computer (1202), in alternative implementations, memory (1206) can be external to the computer (1202).

The application (1207) is an algorithmic software engine providing functionality according to particular needs, desires, or particular implementations of the computer (1202), particularly with respect to functionality described in this disclosure. For example, application (1207) can serve as one or more components, modules, applications, etc. Further, although illustrated as a single application (1207), the application (1207) may be implemented as multiple applications (1207) on the computer (1202). In addition, although illustrated as integral to the computer (1202), in alternative implementations, the application (1207) can be external to the computer (1202).

There may be any number of computers (1202) associated with, or external to, a computer system containing computer (1202), each computer (1202) communicating over network (1230). Further, the term "client," "user," and other appropriate terminology may be used interchangeably as appropriate without departing from the scope of this disclosure.

Moreover, this disclosure contemplates that many users may use one computer (1202), or that one user may use multiple computers (1202).

While the invention has been described with respect to a limited number of embodiments, those skilled in the art, having the benefit of this disclosure, will appreciate that other embodiments can be devised that do not depart from the scope of the invention as described herein. Accordingly, the scope of the invention should be limited only by the accompanying claims.

What is claimed is:

1. A method for determining at least one electrical characteristic in a subsurface region, the method comprising:
   during completion of a first hydrocarbon well, installing at least one first electrically insulating spacer between a plurality of well liners in the first hydrocarbon well to form at least one on-demand electromagnetic source electrode;
   during completion of a second hydrocarbon well, installing at least one second electrically insulating spacer between the plurality of well liners in the second hydrocarbon well to form at least one on-demand electromagnetic receiver electrode;
   performing an electrical survey using the at least one on-demand electromagnetic source electrode and the at least one on-demand electromagnetic receiver electrode to determine at least one measured apparent electrical characteristic;
   determining, using a computer processor, a map of the at least one electrical characteristic in the subsurface region surrounding the at least one on-demand electromagnetic source electrode and the at least one on-demand electromagnetic receiver electrode based, at least in part, on the electrical survey,
   wherein determining the map of the at least one electrical characteristic comprises:
      obtaining a candidate map of the at least one electrical characteristic,
      simulating at least one apparent electrical characteristic using the candidate map,
      forming an objective function based, at least in part, on the at least one simulated apparent electrical characteristic and the at least one measured apparent electrical characteristic, and
      determining the map of the at least one electrical characteristic by updating the candidate map based on finding an extremum of the objective function;
   determining, using a computer processor, a map of at least one formation property based, at least on part, on the map of the at least one electrical characteristic in the subsurface region; and
   updating, using a computer processor, a hydrocarbon reservoir production plan based, at least in part, on the map of the at least one formation property.

2. The method according to claim 1, further comprising stimulating the first hydrocarbon well to produce hydrocarbons at a greater rate based on the updated hydrocarbon reservoir production plan.

3. The method of claim 1, wherein performing the electrical survey comprises measuring at least one apparent electrical characteristic of the subsurface formation.

4. The method according to claim 1, wherein performing the electrical survey comprises:
   forming an on-demand source electrode by making an electrical connection between a well logging tool and at least two well liners separated by the at least one first electrically insulating spacer; and forming an on-demand receiver electrode by making an electrical connection between the well logging tool and at least two well liners separated by the at least one first second electrically insulating spacer.

5. The method according to claim 4, wherein performing the electrical survey further comprises controlling, using the well logging tool, a source voltage and a source current of the on-demand electromagnetic source electrode and monitoring a receiver voltage and a receiver current from the on-demand electromagnetic receiver electrode.

6. The method according to claim 5, wherein performing the electrical survey further comprises receiving a plurality of signals from a global navigation satellite system, wherein the plurality of signals provide a common reference phase for the source current and the receiver current.

7. The method according to claim 1, wherein the first hydrocarbon well and the second hydrocarbon well comprise a common hydrocarbon well.

8. The method of claim 3, wherein the at least one apparent electrical characteristic comprises an apparent conductivity and an apparent chargeability.

9. The method according to claim 1, wherein the map of the at least one formation property is three-dimensional.

10. A system for determining at least one electrical characteristic in a subsurface region, the system comprising:
a plurality of well liners disposed in at least one hydrocarbon well, wherein each well liner comprises an electrically conductive material having a shape of a hollow cylinder;
at least one first electrically insulating spacer disposed between two of the plurality of well liners to form at least one on-demand electromagnetic source electrode;
at least one second electrically insulating spacer disposed between two of the plurality of well liners to form at least one on-demand electromagnetic receiver electrode;
a well logging tool, configured to perform an electrical survey to determine at least one measured apparent electrical characteristic;
a conveyance that disposes the well logging tool within the plurality of well liners; and
a computer processor configured to:
determine a map of the at least one electrical characteristic in a subsurface region surrounding the least one on-demand electromagnetic source electrode and the least one on-demand electromagnetic receiver electrode, and
determine a map of at least one formation property based, at least on part, on the map of the at least one electrical characteristic in the subsurface region, wherein determining the map of the at least one electrical characteristic comprises:
receiving a candidate map of the at least one electrical characteristic;
receiving measured values of at least one apparent electrical characteristic;
simulating at least one apparent electrical characteristic using the candidate map;
forming an objective function based, at least in part, on the at least one simulated apparent electrical characteristic and the at least one measured electrical characteristic; and
determining the map of the at least one electrical characteristic by updating the candidate map based on finding an extremum of the objective function.

11. The system of claim 10, wherein the well logging tool comprises:
a cylindrical housing having an outer diameter less than an inner diameter of the hollow cylinder;
a plurality of insulated centralizers disposed around the cylindrical housing;
a plurality of electrical connections that selectively connect to at least one of the plurality of well liners;
a power connection that receives power from a surface location; and
a communication connection that communicates with the surface location.

12. The system according to claim 11, wherein the well logging tool further comprises a casing collar locator that indicates a position of the well logging tool relative to the well liners and the first or second electrically insulating spacer.

13. The system according to claim 10, further comprising a global navigation satellite receiver, configured to provide a common reference phase for a source current and a receiver current.

14. The system of claim 10, wherein the extremum comprises a minimum.

15. The system of claim 10, wherein the candidate map comprises a gridded representation of a spatial distribution of the at least one electrical characteristic.

16. The system of claim 15, wherein the gridded representation comprises a three-dimensional grid.

17. The system of claim 15, wherein simulating comprises solving Maxwell's equations for the gridded representation of the spatial distribution of the at least one electrical characteristic excited by the at least one on-demand electromagnetic source electrode.

* * * * *